(12) United States Patent
Mun et al.

(10) Patent No.: US 11,570,611 B2
(45) Date of Patent: Jan. 31, 2023

(54) ELECTRONIC DEVICE, EXTERNAL ELECTRONIC DEVICE, AND METHOD FOR MANAGING ESIM OF EXTERNAL ELECTRONIC DEVICE

(71) Applicant: Samsung Electronics Co., Ltd., Gyeonggi-do (KR)

(72) Inventors: Taikuin Mun, Gyeonggi-do (KR); Bongsoo Jeong, Gyeonggi-do (KR); Jiah Choi, Gyeonggi-do (KR); Junbeom Kim, Gyeonggi-do (KR); Donghyoun Son, Gyeonggi-do (KR); Siyoul Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 17/263,205

(22) PCT Filed: May 17, 2019

(86) PCT No.: PCT/KR2019/005964
§ 371 (c)(1),
(2) Date: Jan. 26, 2021

(87) PCT Pub. No.: WO2020/032353
PCT Pub. Date: Feb. 13, 2020

(65) Prior Publication Data
US 2021/0144543 A1 May 13, 2021

(30) Foreign Application Priority Data

Aug. 8, 2018 (KR) .......................... 10-2018-0092466

(51) Int. Cl.
*H04W 8/18* (2009.01)
*H04L 67/02* (2022.01)

(52) U.S. Cl.
CPC ............... *H04W 8/18* (2013.01); *H04L 67/02* (2013.01)

(58) Field of Classification Search
CPC .................................. H04W 8/18; H04L 67/02
(Continued)

(56) References Cited

U.S. PATENT DOCUMENTS

2016/0127132 A1* 5/2016 Lee ..................... H04L 63/0869
713/156
2016/0150400 A1* 5/2016 Cha ....................... H04W 8/245
455/418

(Continued)

FOREIGN PATENT DOCUMENTS

KR 10-2016-0061846 A 6/2016
KR 10-2016-0101626 A 8/2016
(Continued)

*Primary Examiner* — Ahmad F. Matar
*Assistant Examiner* — Jirapon Intavong
(74) *Attorney, Agent, or Firm* — Cha & Reiter, LLC

(57) ABSTRACT

Disclosed according to various embodiments are an electronic device for opening a communication service and a method for an operation of the electronic device. The electronic device may comprise: a display; a memory for storing device information about the electronic device and an application for activating a communication service for an external electronic device; a first communication module for establishing a first communication channel to communicate with at least one of a first external server in which information about a plurality of service providers providing communication services is stored, a second external server related to the activation of communication services, and a third external server for providing a profile for the use of communication services; a second communication module for establishing a second communication channel to communicate with the external electronic device; and a processor, wherein the processor is configured to control the (Continued)

application to: transmit the device information about the electronic device to the external electronic device by using the second communication module; receive, from the external electronic device, information for activating a communication service identified on the basis of the device information about the electronic device; and display a screen for activating the communication service for the external electronic device according to whether each of two or more activation methods for the communication service and contained in the information for activating the communication service is supported.

14 Claims, 17 Drawing Sheets

(58) Field of Classification Search
USPC .......................................................... 455/418
See application file for complete search history.

(56) References Cited

U.S. PATENT DOCUMENTS

| | | |
|---|---|---|
| 2016/0295494 A1 | 10/2016 | Gulati et al. |
| 2017/0048645 A1 | 2/2017 | Yerrabommanahalli et al. |
| 2017/0150542 A1 | 5/2017 | Chhabra |
| 2017/0359913 A1 | 12/2017 | Spencer et al. |
| 2018/0041601 A1* | 2/2018 | Park ...................... H04L 67/327 |
| 2018/0098178 A1* | 4/2018 | Yerrabommanahalli .................... H04W 12/45 |
| 2020/0059778 A1* | 2/2020 | Li ........................ H04W 12/40 |

FOREIGN PATENT DOCUMENTS

| | | |
|---|---|---|
| KR | 10-2017-0132193 A | 12/2017 |
| KR | 10-2018-0032633 A | 3/2018 |
| WO | 2014-193181 A1 | 12/2014 |

\* cited by examiner

FIG. 10

```
{
        .
        .
        .
  "approved_versions" :
  "{
      "SM-R805U" : "
      {
          "TMO" : "R805USQE1ARG7",
          "ATT" : "R805USQE1ARG8"
      }",
      "SM_R815U" : "
      {
          "TMO" : "R805USQE1ARG7",
          "ATT" : "R805USQE1ARG8"
      }"
  }",
}
```

ELECTRONIC DEVICE, EXTERNAL ELECTRONIC DEVICE, AND METHOD FOR MANAGING ESIM OF EXTERNAL ELECTRONIC DEVICE

CROSS REFERENCE TO RELATED APPLICATIONS

This application is a National Phase Entry of PCT International Application No. PCT/KR2019/005964, which was filed on May 17, 2019, and claims a priority to Korean Patent Application No. 10-2018-0092466, which was filed on Aug. 8, 2018, the contents of which are incorporated herein by reference.

TECHNICAL FIELD

Various embodiments of the disclosure relate to a method for operating an external electronic device and an electronic device and, more specifically, to a technology for managing the eSIM of an external electronic device connected to an electronic device.

BACKGROUND ART

An electronic device may use a network provided by a communication service operator in order to perform wireless communication. In order to use a network provided by the operator, authentication between a server provided by the operator and the electronic device is necessary. The electronic device may perform authentication with the server provided by the operator by using a profile stored in the electronic device.

DISCLOSURE OF INVENTION

Technical Problem

If electronic devices include a UICC card, a separate subscription service provided by a communication service provider (for example, a subscription service at a shop run by the communication service provider) may be used to perform subscription and management regarding a communication service available to multiple electronic devices (for example, a communication service of using a cellular network provided by the communication service provider).

In order to perform a communication service activation operation including communication service subscription regarding multiple electronic devices, it is necessary to access a communication service management server or a profile providing server, which is run by the communication service provider. If the address for accessing the communication service management server or the profile providing server run by the communication service provider is not provided, communication service activation may fail.

An electronic device according to various embodiments of the disclosure may display a screen for performing activation of a communication service according to information regarding whether each of communication service activation schemes is supported, which is received from an external server that stores information regarding multiple operators providing a communication service, and may then perform activation of a communication service with an external electronic device.

Solution to Problem

An electronic device according to various embodiments of the disclosure may include: a display; a memory configured to store device information of the electronic device and an application for activating a communication service of an external electronic device; a first communication module configured to establish a first communication channel with at least one server among a first external server storing information associated with a plurality of operators that provide communication services, a second external server related to activation of a communication service, and a third external server that provides a profile for use of a communication service; a second communication module configured to establish a second communication channel with the external electronic device; and a processor. The processor may be configured to: transmit the device information of the electronic device to the external electronic device using the second communication module; receive, from the external electronic device, information for activation of a communication service identified based on the device information of the electronic device; and control the application so as to display a screen for performing activation of a communication service of the external electronic device based on information, which is associated with whether each of at least two activation schemes for the communication service is supported and is included in the information for activation of the communication service.

An operation method of an electronic device according to various embodiments of the disclosure may include: generating a first communication channel for performing data transmission and/or reception with at least one server among a first external service that stores information associated with a plurality of operators that provide communication services, a second external server related to activation of a communication service, and a third external server that provides a profile for use of a communication service, and generating a second communication channel for performing data transmission and/or reception with an external electronic device; transmitting device information of the electronic device to the external electronic device; receiving, from the external electronic device, information for activation of a communication service of the external electronic device which is identified based on the device information of the electronic device; and displaying a screen for activating the communication service of the external electronic device based on information, which is associated with whether each of at least two activation schemes of the communication service is supported and is included in the information for activation of the communication service.

Advantageous Effects of Invention

An electronic device and a method for operating the electronic device, according to various embodiments of the disclosure, may activate a communication service of a communication service provider available to an external electronic device by using information regrading communication service activation provided by a first external server that stores information regarding multiple communication service providers.

An electronic device and a method for operating the electronic device, according to various embodiments of the disclosure, may display a different screen for activating a communication service according to a communication service activation scheme supported by an operator who provides a communication service, thereby facilitating the user's operations of subscribing to a communication service regarding an external electronic device and managing the same.

BRIEF DESCRIPTION OF DRAWINGS

FIG. 10 is a diagram illustrating information associated with whether an external electronic device is capable of being opened, which is stored in a first external server and is displayed in an electronic device according to various embodiments of the disclosure.

MODE FOR CARRYING OUT THE INVENTION

Figure 1:
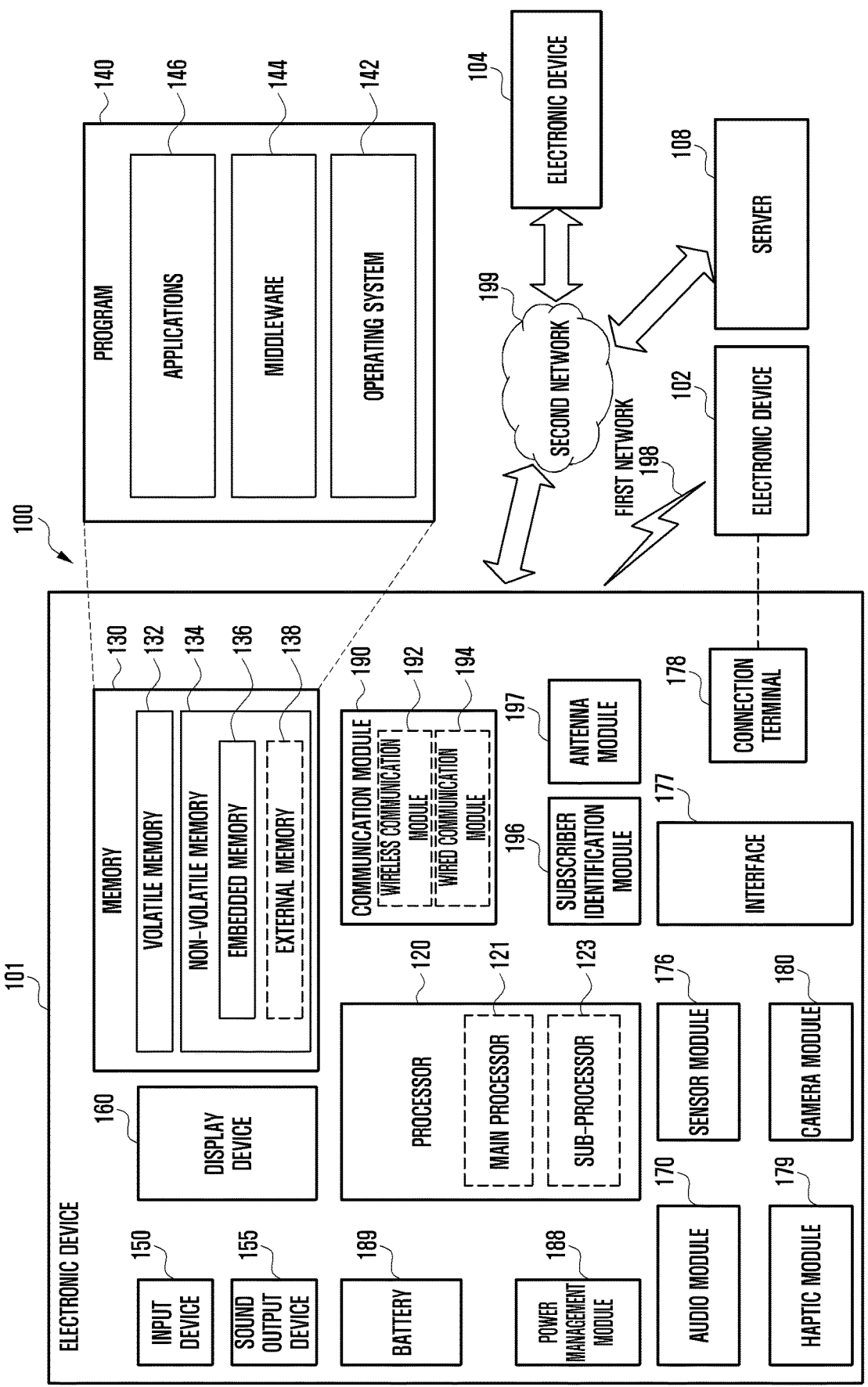
FIG. 1 is a block diagram of an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
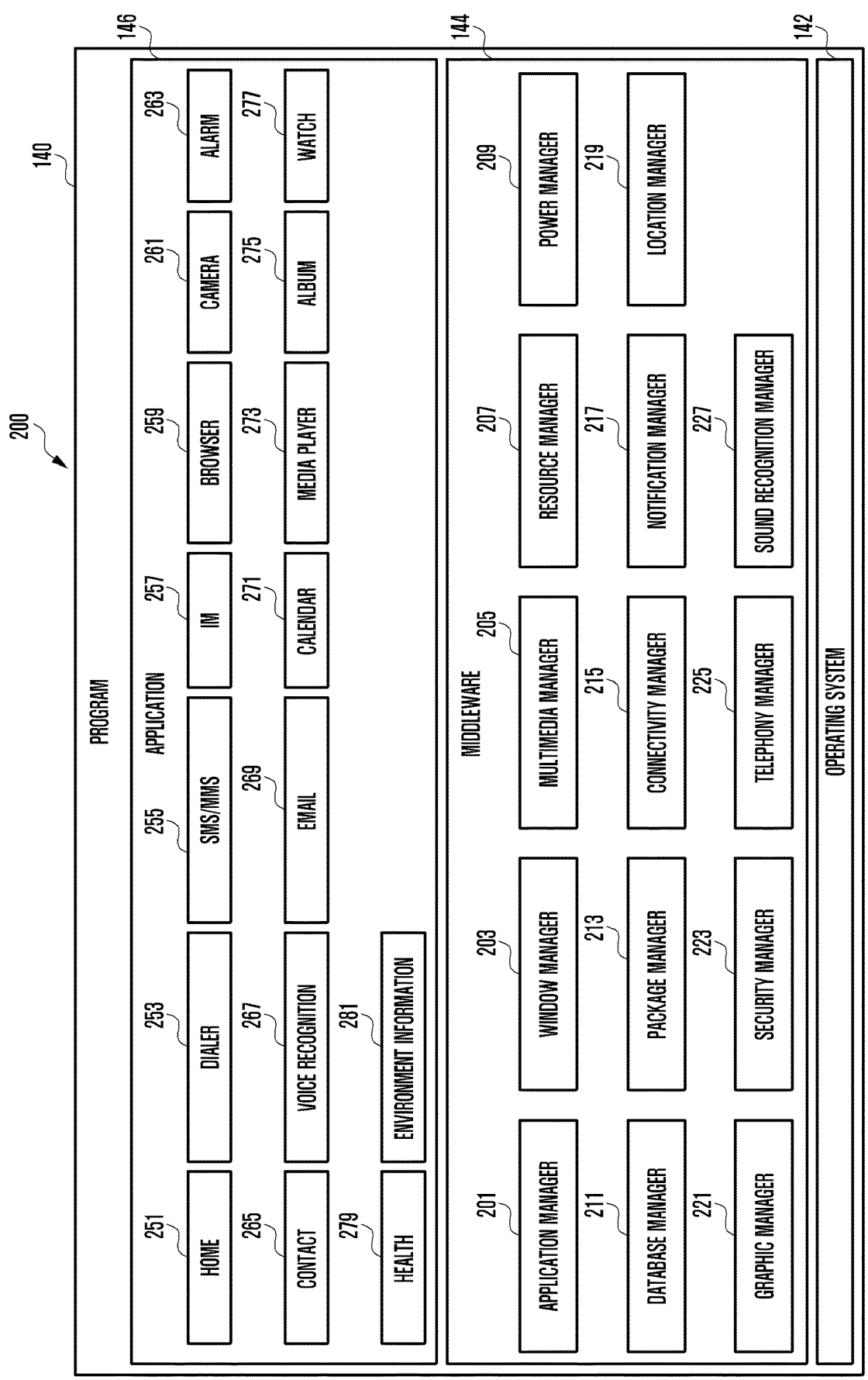
FIG. 2 is a block diagram of a program according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

According to various embodiments, a universal integrated circuit card (UICC) is a smart cart which is inserted into a mobile communication terminal for use, and is a chip that enables secure mobile communication by authenticating a subscriber and generating a traffic secure key when accessing a mobile communication network. Depending on the type of mobile communication network that a subscriber accesses, the UICC may include a communication application such as a subscriber identification module (SIM), a universal SIM (USIM), or an IP multimedia SIM (ISIM). Also, a high-level secure function may be provided in order to contain various applications, such as an electronic wallet, ticketing, or an electronic passport.

According to various embodiments, an embedded UICC (eUICC) may be a secure module provided in the form of a chip embedded in a terminal, as opposed to a removable form which is capable of being inserted into, or detached from, a terminal. The eUICC may download a profile via over the air (OTA) technology, and may install the same. The eUICC may be referred to as a UICC that is capable of downloading and installing a profile.

The method of downloading a profile via the OTA technology, and installing the same in the eUICC according to various embodiments of the disclosure may be applicable to a removable UICC which is capable of being inserted into and detached from a terminal. In the embodiments of the disclosure, the method may be applied to a UICC that is capable of downloading a profile via the OTA and installing the same.

According to various embodiments of the disclosure, the term "UICC" may be interchangeably used with a "subscriber identification module (SIM)", and the term "eUICC" may be interchangeably used with an "embedded SIM (eSIM)".

According to various embodiments in the specification, a profile may be a package in which at least one of an application, a file system, and an authentication key value stored in the UICC is packaged in the form of software.

According to various embodiments in this specification, a USIM profile may have the same meaning as a profile, or may be a package in which information incorporated in a USIM application in a profile is packaged in the form of software.

According to various embodiments in this specification, a profile provision server may be expressed as a subscription manager data preparation (SM-DP), a subscription manager data preparation plus (SM-DP+), an off-card entity of profile domain, a profile encryption server, a profile generation server, a profile provisioner (PP), a profile provider, a profile provisioning credentials holder (PPC holder), or a server.

According to various embodiments in this specification, a profile information transfer server may be expressed as a discovery and push function (DPF), or a subscription manager discovery service (SM-DS).

According to various embodiments in this specification, a profile management server may be expressed as a subscription manager secure routing (SM-SR), a subscription manager secure routing plus (SM-SR+), an off-card entity of eUICC profile manager, a profile management credentials holder (PMC holder), or an eUICC manager (EM).

According to various embodiments in this specification, a profile server may be expressed as a server that is capable of performing any one or more of operations performed by the profile provision server, the profile management server, or the profile information transfer server.

According to various embodiments in the specification, the term "terminal" may be referred to as a mobile state (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various examples of the terminal may include a cellular phone, a smart phone having a wireless communication function, a personal digital assistant (PDA) having a wireless communication device, a wireless modem, a portable computer having a wireless communication function, a photographing device, such as a digital camera having a wireless communication function, a gaming device having a wireless communication function, electric appliance for storing and reproducing music, which has a wireless communication function, Internet electric appliance capable of accessing and browsing the Internet in a wireless manner, a wearable device detachable from the body of a user, and portable units or terminals which include combinations of the functions. Furthermore, a terminal may include, but is not limited to a machine to machine (M2M) terminal and a machine type communication (MTC) terminal/device. According to various embodiments in this specification, the terminal may also be referred to as an electronic device.

According to various embodiments in the specification, an electronic device or an external electronic device may contain a UICC that is capable of downloading and installing a profile. If a UICC is not included in the electronic device, the UICC that is physically separate from the electronic device may be inserted into the electronic device and may be connected thereto. For example, the UICC may be inserted into the electronic device, in the form of a card. The electronic device may include the terminal, and in this instance, the terminal may be a terminal that includes a UICC that is capable of downloading and installing a profile. The UICC may be contained in or inserted into the terminal. The UICC that is capable of downloading and installing a profile may be, for example, referred to as an eUICC.

According to various embodiments in this specification, a profile identifier may be referred to as a factor that matches a profile ID, an integrated circuit card ID (ICCID), an ISD-P, or a profile domain (PD). The profile ID may be the unique identity of each profile.

According to various embodiments in this specification, an eUICC identity (eUICC ID) may be the unique identity of an eUICC embedded in a terminal, and may be referred to as eUICC ID (EID). Alternatively, if a provisioning profile is included in an eUICC, that may be the profile identity (profile ID) of the corresponding provisioning profile. Alternatively, that may be a terminal ID if an eUICC chip and a terminal do not separate. Alternatively, that may indicate a predetermined secure domain of an eUICC chip.

Hereinafter, an electronic device according to various embodiments of the disclosure will be described.

Figure 3:
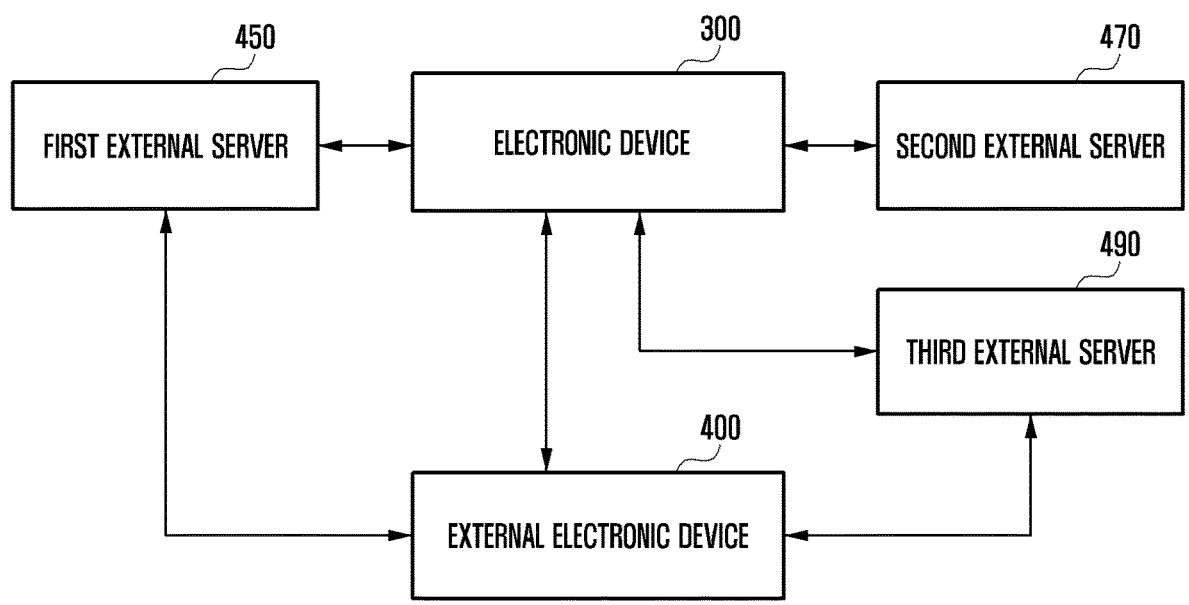
FIG. 3 is a diagram illustrating the relationship among an electronic device, an external electronic device, a first external server, a second external server, and a third external server according to various embodiments of the disclosure.

FIG. 3 is a diagram illustrating the relationship among an electronic device 300, an external electronic device 400, a first external server 450, a second external server 470, and/or a third external server 490 according to various embodiments of the disclosure.

According to various embodiments of the disclosure, the electronic device 300, the external electronic device 400, the first external server 450, the second external server 470, and the third external server 490 may include at least a part of the various component elements included in the electronic device 101 of FIG. 1.

According to various embodiments, the electronic device 300 may be connected to the external electronic device 400 via various communication devices (e.g., various communication devices capable of performing data transmission and/or reception, including a short-range communication device, such as Bluetooth, NFC, or Wi-Fi, or a long-range communication device, such as LTE or 5G). According to various embodiments of the disclosure, the electronic device 300 may perform an operation so that the external electronic device 400 activates a communication service provided by a communication service provider (e.g., an operator that provides a data transmission and/or reception support service using various communication devices). The electronic device 300 may establish a communication connection with the first external server 400 so that the external electronic device 400 is capable of performing data transmission and/or reception with the first external server 450. For example, the electronic device 300 may transmit, to the first external server 450, device information of the electronic device 300 and a signal for requesting information for activation of a communication service of the external electronic device 400, which are transmitted from the external electronic device 400.

According to various embodiments of the disclosure, the electronic device 300 may access the address of the second external server 470 included in the information for activation of the communication service. The electronic device 300 may activate the communication service of the external electronic device 400 using data transmitted to and/or received from the second external server 470. For example, the electronic device 300 may subscribe to the communication service. According to various embodiments of the disclosure, the electronic device 300 may perform at least a part of operations for management (e.g., changing a communication service rate system, deactivating a communication service, or cancelling a communication service) of the communication service used via the external electronic device 400.

According to various embodiments of the disclosure, if subscribing to the communication service is completed, the second external server 470 may transmit data related to subscription to the communication service to the third external server 490, and may request the third external server 490 to generate a profile to be installed in the external electronic device 400. The third external server 490 may generate a profile using the data, which is related to subscription to the communication service and is received from the second external server 470, and may store the generated profile. The electronic device 300 may receive the profile from the third external server 490, and may perform at least a part of an operation of installing the profile in the external electronic device 400.

According to various embodiments of the disclosure, the external electronic deice 400 may be an electronic device that transmits and/or receives various data using a communication service provided by a communication service provider. For example, the external electronic device 400 may be a smart phone, a wearable device, or one of the various electronic devices that support network communication. A profile may be installed in the external electronic device 400 so that the external electronic device 400 uses a communication service provided by a communication service provider.

According to various embodiments, the external electronic device 400 may contain a UICC that is capable of downloading and installing a profile. Alternatively, the UICC that is physically separate from the external electronic device 400 may be inserted into the electronic device and may be connected thereto. For example, the UICC may be inserted, into the external electronic device 400, in the form of a card. The UICC may be embedded in the external electronic device 400, or may be inserted into the external electronic device 400 and may be connected to the external electronic device 400. The UICC that is capable of downloading and installing a profile may be, for example, referred to as an eUICC.

According to various embodiments of the disclosure, the profile may be access information used for accessing a communication service operator that manages communication that the external electronic device 400 uses. The access information may include an international mobile subscriber identity (IMSI) which is a type of a subscriber identifier, and a value for authentication for the use of a network provided by the communication service operator, together with the subscriber identity.

According to various embodiments of the disclosure, the first external server 450 may store information associated with at least one operator that provides a communication service that the electronic device 300 and the external electronic device 400 are capable of using. The first external server 450 may receive device information transmitted from the electronic device 300 or the external electronic device 400, and may select an operator that provides a communication service that the electronic device 300 or the external electronic device 400 is capable of using among the operators stored in the first external server 450, based on the device information. The first external server 450 may transmit, to the electronic device 300 or the external electronic device 400, information for activation of a service provided by the selected operator.

According to various embodiments of the disclosure, the second external server 470 may be a server (e.g., an entitlement server) that manages the right for a communication service that the external electronic device 400 or the electronic device 300 uses. The second external server 470 may store information associated with a rate system that a user of the electronic device 300 or the external electronic device 400 is capable of using and/or information associated with at least one service that the external electronic device 400 is capable of using, and may transmit the identity of each of the at least one service that the user of the electronic device 300 or the external electronic device 400 is capable of using to the electronic device 300 or the external electronic device 400, in response to a request from the electronic device 300 or the external electronic device 400. As another example, the second external server 470 may determine whether the electronic device 300 or the external electronic device 400 has the right to use a communication service, based on data transmitted from the electronic device 300 (e.g., the device information of the electronic device 300 and/or the device information of the external electronic device 400). According to various embodiments, the second external server 470 may have a lower security level than that of the third external server 490 that provides a profile. For example, the second external server 470 may provide data (e.g., at least one identity or configuration information related to a communication service) that requires lower security than that the profile requires.

According to various embodiments of the disclosure, the configuration information related to a communication service may be data that may be used for activation or deactivation of the communication service. For example, the configuration information related to the communication service may include various information, such as information indicating whether to activate or deactivate at least one communication service, or indicating whether to activate or deactivate at least a part of functions related to the communication service (e.g., information provided in a flag type that expresses data indicating activation of a function using "1" and expresses data indicating deactivation of a function using "0"), or information indicating whether to activate other services related to the communication service corresponding to the configuration information.

According to various embodiments, the third external server 490 may generate and store a profile based on information (e.g., the right to use a communication service), which is transmitted from the second external server 470 and is associated with a communication service that the electronic device 300 and/or the external electronic device 400 uses. The third external server 490 may transmit the profile to the electronic device 300 or the external electronic device 400.

Although the single external electronic device 400 is illustrated in FIG. 3, this is merely for ease of description, and multiple external electronic devices 400 may be connected to the electronic device 300.

Figure 4A:
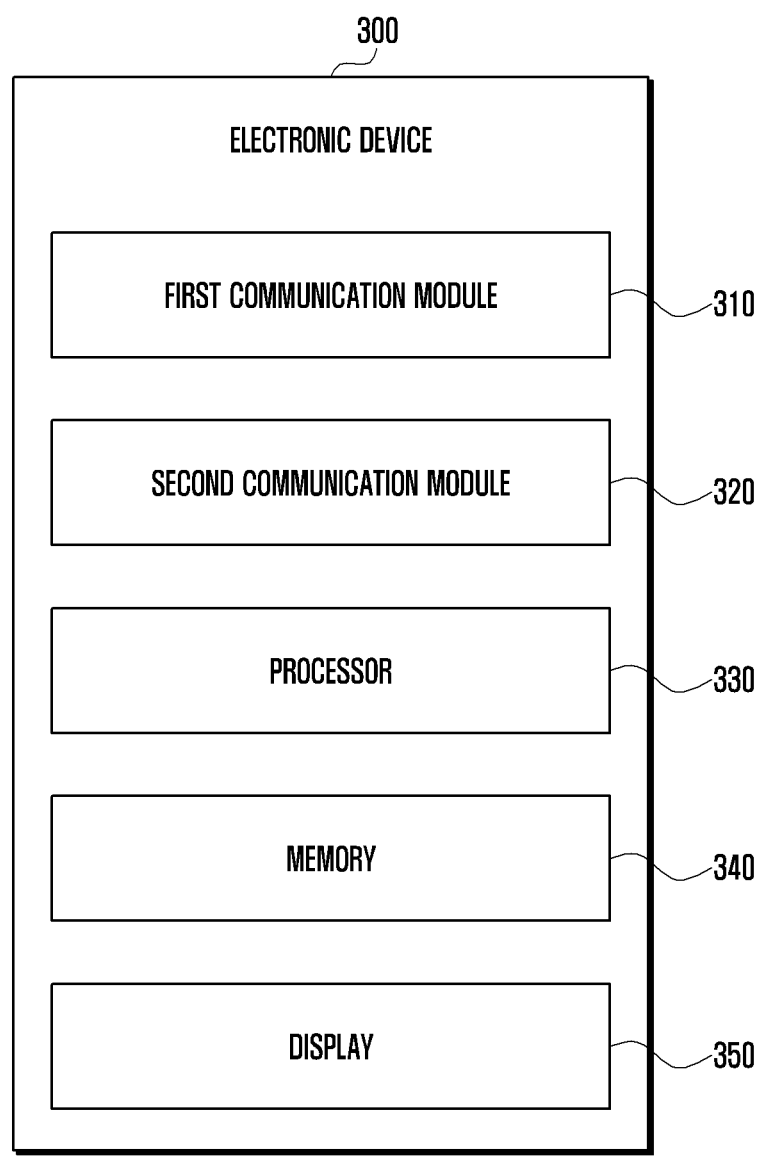
FIG. 4A is a block diagram of an electronic device according to various embodiments of the disclosure.

FIG. 4A is a block diagram of an electronic device according to various embodiments of the disclosure.

Referring to FIG. 4A, the electronic device 300 according to various embodiments of the disclosure may include a first communication module 310, a second communication module 320, a processor 330, a memory 340, and/or a display 350.

According to various embodiments of the disclosure, the first communication module 310 may establish a first communication channel, which corresponds to a first communication scheme, with the first external server 450, the second external server 470, and the third external server 490, and may perform data transmission and/or reception with the first external server 450, the second external server 470, or the third external server 490. According to various embodiments of the disclosure, the first communication channel may be a communication channel generated using any communication scheme (e.g., a cellular communication scheme or a Wi-Fi communication scheme) that is capable of establishing a connection with the first external server 450, the second external server 470, and the third external server 490.

According to various embodiments of the disclosure, the second communication module 320 may establish a second communication channel, which corresponds to a second communication scheme (e.g., including a short-rage communication scheme such as Bluetooth, NFC, or Wi-Fi direct), with the external electronic device 400.

According to various embodiments of the disclosure, the external electronic device 400 may transmit a signal for requesting activation of a cellular communication service of the external electronic device 400 to the electronic device 300 via the second communication module 320. For example, if the external electronic device 400 connects to the electronic device 300 for the first time using the second communication module 320, the external electronic device 400 may transmit, to the electronic device 300, a signal for requesting activation of a communication service of the external electronic device 400.

The processor 330 may receive the signal for requesting activation of a communication service transmitted from the external electronic device 400, and may transmit device information of the electronic device 300 to the external electronic device 400.

According to various embodiments of the disclosure, the device information of the electronic device 300 may be information used for selecting a communication service operator that provides a communication service that the electronic device 300 and the external electronic device 400 are capable of using, from among stored information associated with a plurality of communication service operators stored in the first external server 450. For example, the device information of the electronic device 300 may include a mobile country code (MCC) and/or a mobile network code (MNC).

According to various embodiments of the disclosure, the processor 330 may include information for activation of the communication service, which is transmitted from the external electronic device 400. The information for activation of the communication service may include at least a part of information from among the address of the second external server 470, the address of the third external server 490, subscriber identify module (SIM) card information provided by a communication service operator, and information associated with whether at least one activation scheme (e.g., a first scheme that activates a communication service off-line in a shop of a communication service operator, a second scheme that activates a communication service on-line using the second external server 470, and a third scheme that activates a communication service by inputting an activation code) for activating a communication service is supported.

According to various embodiments of the disclosure, the external electronic device 400 may be in the state in which a communication service (e.g., a cellular network) is not yet activated, and the external electronic device 400 is incapable of performing data transmission and/or reception with the first external server 450. The processor 330 may support the external electronic device 400 to be capable of performing data transmission and/or reception with the first external server 450. The processor 330 may receive data that the external electronic device 400 transmits via the second communication channel, and may transmit data, transmitted from the external electronic device 400, to the first external server 450 via the first communication channel. The processor 330 may receive the data, transmitted from the first external server 450, via the first communication channel, and may transmit the received data to the external electronic device 400 via the second communication channel.

According to various embodiments of the disclosure, the processor 330 may perform operations for activating a communication service of the external electronic device 400 using the information for activation of the communication service, which is transmitted from the external electronic device 400. The processor 330 may execute an application for controlling the external electronic device 400 which is stored in the memory 340. The processor 330 may activate the communication service of the external electronic device 400 using the information for activating the communication service, on the application for controlling the external electronic device 400.

According to various embodiments of the disclosure, the processor 330 may display a screen for activating the communication service of the external electronic device 400, depending on information, which is associated with whether each of at least two activation schemes of the communication service is supported and is included in the information for activation of the communication service. For example, in response to identifying that a communication service operator that provides the communication service supports the first scheme that activates a communication service off-line in a shop of the communication service operator, the processor 330 may display a screen for downloading a profile from the third external server 490. As another example, in response to identifying that the operator supports the second scheme that activates a communication service on-line using the second external server 470, the processor 330 may display a webpage, which is for activating the communication service and is received from the second external server 470. As another example, in response to identifying that the operator supports the third scheme that activates a communication service by inputting an activation code, the processor 330 may display a screen for receiving an activation code.

According to various embodiments of the disclosure, the processor 330 may identify whether the communication service operator supports the first scheme that activates a communication service off-line in a shop of the communication service operator, based on activation scheme information included in the information for activation which is transmitted from the external electronic device 400. In response to identifying that the communication service operator supports the first scheme, the processor 330 may access the address of the third external server 490 included in the information for activation, and may request a profile from the third external server 490. The processor 330 may display a screen reporting that requesting a profile from the third external server 490 is ongoing, or a screen reporting that a profile is being downloaded from the third external server 490.

According to various embodiments of the disclosure, the processor 330 may identify whether the communication service operator supports the second scheme that activates a communication service using the second external server 470, based on the information for activation which is transmitted from the external electronic device 400. In response to identifying the second scheme, the processor 330 may access the second external server 470 using the address of the second external server 470, or an authentication method for accessing the second external server 470 (e.g., a shared token, EAP-AKA, SMS OTP, IP Auth, or open ID connect), which is included in the information for activation. The processor 330 may perform an operation for activating a communication service using the second external server 470.

According to various embodiments of the disclosure, the processor 330 may transmit an identity, which is used when the operator that provides the communication service identifies a subscriber and is included in the information for activation of the communication service, to the second external server 470. The second external server 470 may transmit the address of a webpage for selecting a service (e.g., a rate system) that the external electronic device 400 is capable of using, to the electronic device 300 based on the identity transmitted from the electronic device 300. The processor 330 may receive the webpage address, and may control the display 350 to display the webpage. The processor 330 may receive, from a user, a user input for selecting a service on the webpage. The processor 330 may transmit the user input to the second external server 750.

According to various embodiments of the disclosure, the processor 330 may identify whether the communication service operator supports the third scheme that activates a communication service using an activation code, based on the information for activation which is transmitted from the external electronic device 400. The activation code may be a key that needs to be input for activation of the communication service, and the activation code may be implemented as a key including characters, numbers, or special characters, or may be implemented in the form of QR-code. In response to identifying that the third scheme is supported, the processor 330 may perform an operation of requesting input of an activation code. The processor 330 may control the display 350 to display a screen that requests a user to input an activation code, and may control a camera (e.g., the camera module 180 of FIG. 1) to receive QR code.

According to various embodiments, the electronic device 300 may receive data needed for installing a profile in an eUICC included in the external electronic device 400 from the third external server 490 via the first communication module 310. The data needed for installing the profile may be received from the third external server 490 (e.g., SM-DP+ server) provided from a communication service provider. The data needed for installing the profile may be provided in the form of an encrypted profile package. The encryption of the profile may be performed according to the standard specifications defined in SGP. 22, but is not limited thereto.

According to various embodiments of the disclosure, the processor 330 may receive the profile package, and may transmit the profile to the external electronic device 400 using the profile package.

According to various embodiments of the disclosure, the processor 330 may identify information, which is associated with an electronic device (e.g., the external electronic device 400 of FIG. 3) capable of activating the communication service, and is included in the information for activation of the communication service, and may determine whether the communication service of the external electronic device 400 is capable of being activated, based on the information associated with the electronic device 400. The information associated with the electronic device 400 may include information associated with the electronic device 400 capable of activating the communication service, for example, terminal information of the electronic device 400, identity information of the communication service operator of the electronic device 400 and/or the version information of an operating system installed in the electronic device 400. The processor 330 may identify the information associated with the electronic device 400, and may determine whether the external electronic device 400 is the electronic device 400 capable of activating the communication service. If the external electronic device 400 is the electronic device 400 capable of activating the communication service, the processor 330 may perform an operation for activating the communication service of the external electronic device 400. If the external electronic device 400 is an electronic device incapable of activating the communication service, the processor 330 may not perform activation of the communication service of the external electronic device 400.

Figure 4B:
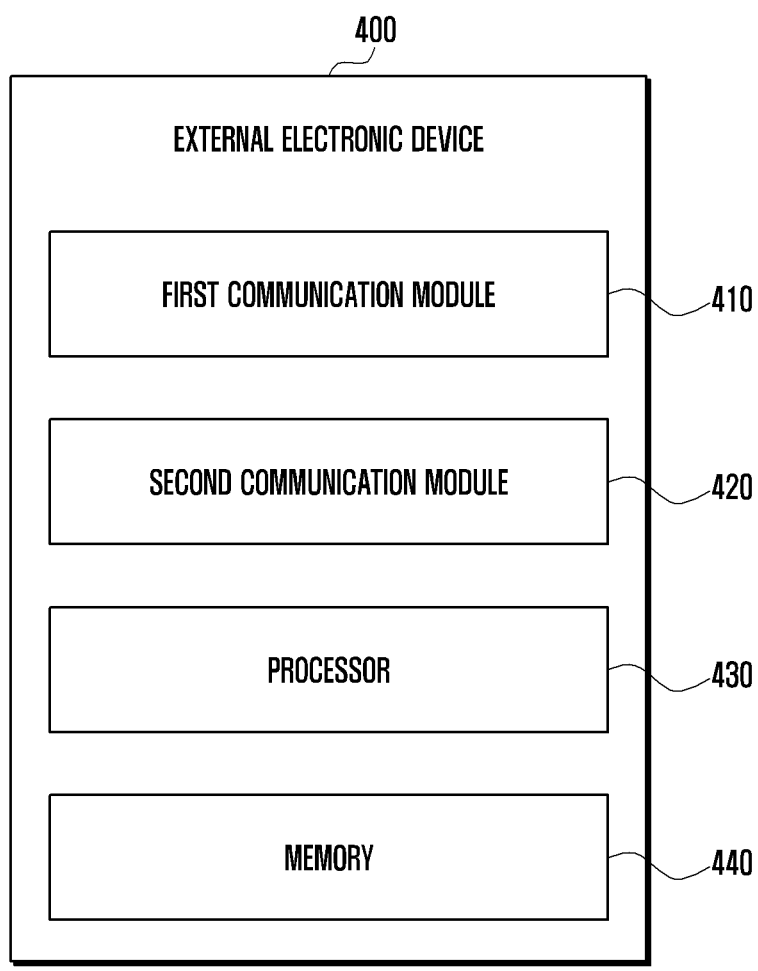
FIG. 4B is a block diagram of an external electronic device according to various embodiments of the disclosure.

FIG. 4B is a block diagram of an external electronic device according to various embodiments of the disclosure.

Referring to FIG. 4B, the external electronic device 400 according to various embodiments of the disclosure may include a first communication module 410, a second communication module 420, a processor 430, and/or a memory 440. According to an embodiment, the external electronic device 400 may further include a display (e.g., the display device 160 of FIG. 1).

According to various embodiments of the disclosure, the first communication module 410 may establish a first communication channel, which corresponds to a first communication scheme (e.g., a cellular network), with a first external server (e.g., the first external server 450 of FIG. 3), a second external server (e.g., the second external server 470 of FIG. 3), or a third external server (e.g., the third external server 490 of FIG. 3). According to the first communication scheme, activation may be performed by an operation in which the electronic device 300 activates a communication service based on the information for activation of a communication service.

According to various embodiments of the disclosure, the second communication module 420 may establish a second communication connection, which corresponds to a second communication scheme (e.g., including a short-rage communication scheme such as Bluetooth, NFC, or Wi-Fi direct), with an electronic device (e.g., the electronic device 300 of FIG. 3).

According to various embodiments of the disclosure, device information of the external electronic device 400 may be stored in the memory 440. The device information of the external electronic device 400 may include identity information of the external electronic device 400 (e.g., an identifier of a SIM (eSIM identifier (EID) of the external electronic device 400 or various identity information that distinguish the external electronic device 400 including the IMSI or IMEI information of the external electronic device from other electronic devices).

According to various embodiments of the disclosure, the processor 430 may receive a user input for activating a communication service, and may transmit the device information of the external electronic device 400 to the electronic device 300 using the second communication module 420. The device information of the external electronic device 400 may be used when the second external server 470 performs an operation for activating a communication service of the external electronic device 400. For example, the device information of the external electronic device 400 may be used when the second external server 470 searches for a service that the external electronic device 400 is capable of using. The external electronic device 400 may transmit the device information of the external electronic device 400 to the electronic device 300. The electronic device 300 may access the second external server 470 using the address of the second external server 470 included in the information for activation of a communication service which is received from the first external server 450. The electronic device 300 may transmit the device information associated with the external electronic device 400 to the second external server 470.

According to various embodiments of the disclosure, the processor 430 may request device information of the electronic device 300 using the second communication module 420, and may receive the device information of the electronic device 300 via the second communication module 420.

According to various embodiments of the disclosure, the processor 430 may perform data transmission and/or reception with the first external server 450. If a communication service of the external electronic device 400 is not activated, the external electronic device 400 is incapable of using a cellular network, and the external electronic device 400 may perform data transmission and/or reception with the first external server 450 using a communication network supported by the electronic device 300.

According to various embodiments of the disclosure, the processor 430 may transmit, to the first external server 450, the device information of the electronic device 300 and a signal for requesting information for activation of a communication service. The first external server 450 may select a communication service operator that the external electronic device 400 is capable of using, based on the device information of the electronic device 300, and may transmit information for activation of a communication service corresponding to the selected communication service operator to the external electronic device 400. The information for activation of the communication service may include at least a part of information from among the address of the second external server 470, the address of the third external server 490, subscriber identify module (SIM) card information provided by the communication service operator, and information associated with whether at least one activation scheme (e.g., a first scheme that activates a communication service off-line in a shop of a communication service operator, a second scheme that activates a communication service on-line using the second external server 470, and a third scheme that activates a communication service by inputting an activation code) for performing activation of the communication service is supported.

According to various embodiments of the disclosure, the processor 430 may receive the information for activation of the communication service from the first external server 450 via a communication network provided by the electronic device 300. The processor 430 may transmit the information for activation of the communication service to the electronic device 300 via the second communication module 320.

Figure 4C:
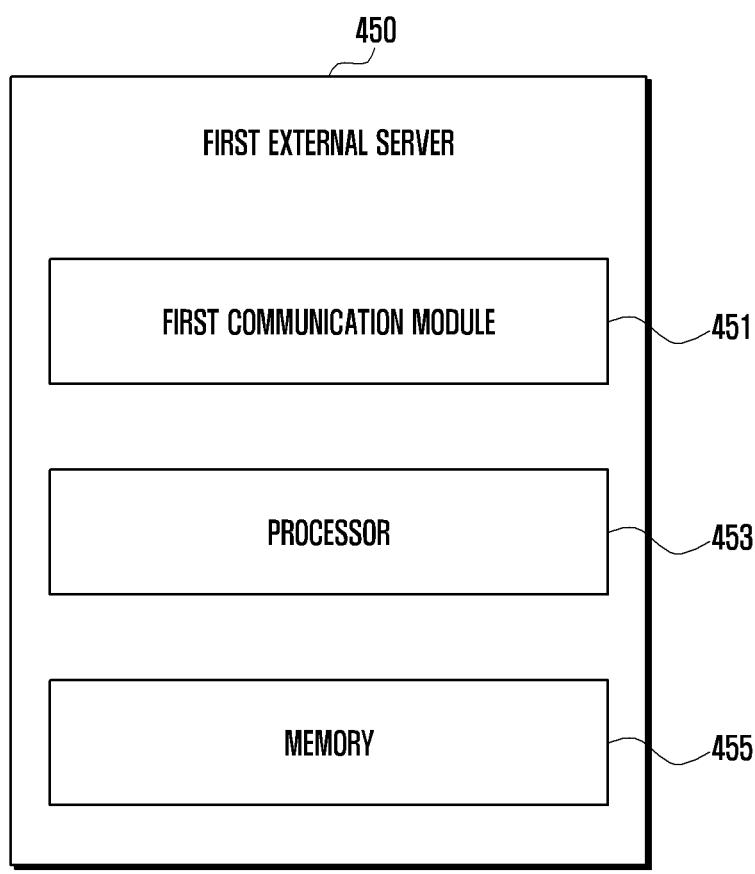
FIG. 4C is a block diagram of a first external server according to various embodiments of the disclosure.

FIG. 4C is a block diagram of the first external server 450 according to various embodiments of the disclosure.

The first external server 450 according to various embodiments of the disclosure may include a first communication module 451, a processor 453, and/or a memory 455.

According to various embodiments of the disclosure, the first communication module 451 may perform data transmission and/or reception with an electronic device (e.g., the electronic device 300 of FIG. 3) or an external electronic device (e.g., the external electronic device 400 of FIG. 3) according to a first communication scheme (e.g., Wi-Fi or cellular network).

According to various embodiments of the disclosure, information for activation of a communication service of the external electronic device 400 may be stored in the memory 455. The information for activation of a communication service may include information associated with whether at least one activation scheme (e.g., a first scheme that activates a communication service off-line in a shop of a communication service operator, a second scheme that activates a communication service on-line using the second external server 470, and a third scheme that activates a communication service by inputting an activation code) for performing activation of the communication service is supported.

According to various embodiments of the disclosure, the information for activation of a communication service of the external electronic device 400 may include data indicating whether activation schemes of the communication service of each communication service operator are supported. The information for activation of a communication service may include information as shown in Table 1 below.

TABLE 1

| MCC/MNC | Support of first scheme | Support of second scheme | Support of third scheme |
|---------|-------------------------|--------------------------|-------------------------|
| AAA/BBB | ○ | ○ | ○ |
| CCC/DDD | ○ | X | X |
| EEE/FFF | X | ○ | ○ |

Referring to Table 1, an MCC/MNC combination may differ for each operator, and information for activation of a communication service may include data indicating whether a first scheme, a second scheme, or a third scheme is supported for each operator.

According to various embodiments of the disclosure, the information for activation of a communication service may include information for identifying a communication service operator. The information for identifying a communication service operator may include a mobile country code (MCC) or a mobile network code (MNC). The processor 453 may receive device information of the electronic device 300, which includes a mobile country code and/or a mobile network code and is transmitted from the external electronic device 400, and may identify a communication service operator corresponding to the device information of the electronic device 300. The processor 453 may transmit, to the external electronic device 400, information for activation of a communication service corresponding to the identified communication service operator.

According to various embodiments of the disclosure, the information for activation of the communication service of the external electronic device 400 may include information associated with an electronic device (e.g., the external electronic device 400 of FIG. 3) capable of activating the communication service. The information associated with the electronic device 400 may include information associated with the electronic device 400 capable of activating the communication service, for example, terminal information of the electronic device 400, identity information of the communication service operator of the electronic device 400 and/or the version information of an operating system installed in the electronic device 400. The processor 453 may transmit, to the external electronic device 400, information for activation of the communication service including the information associated with the electronic device 400 capable of activating the communication service. The electronic device 300 may determine whether the external electronic device 400 is the electronic device 400 capable of activating the communication service, based on the information associated with the electronic device 400 capable of activating the communication service.

Figure 4D:
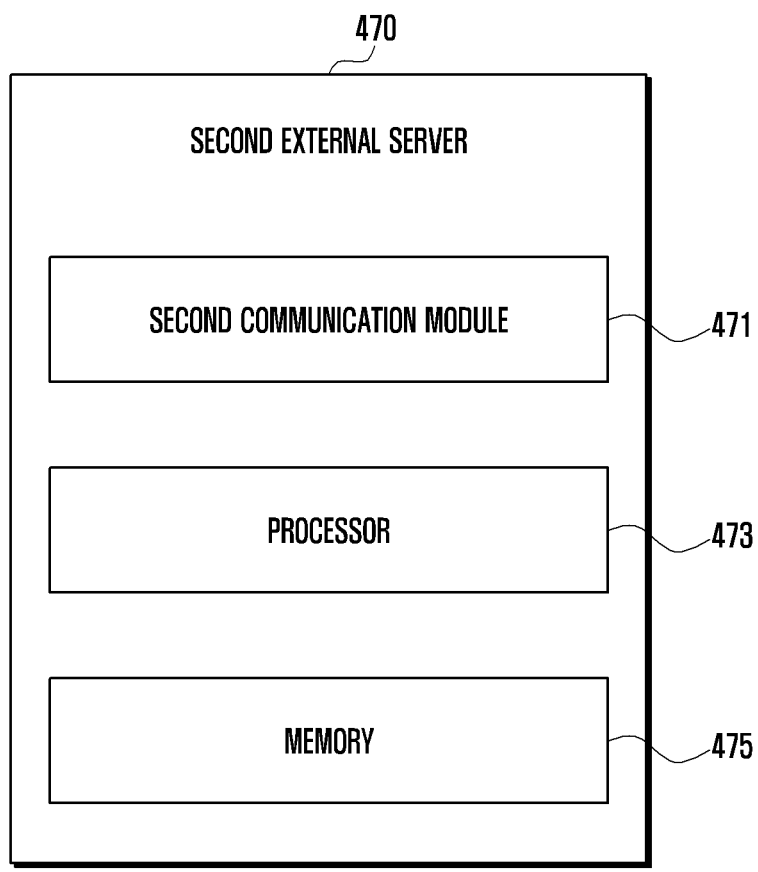
FIG. 4D is a block diagram of a second external server according to various embodiments of the disclosure.

FIG. 4D is a block diagram of a second external server according to various embodiments of the disclosure.

Referring to FIG. 4D, the second external server 470 according to various embodiments of the disclosure may include a first communication module 471, a processor 473, and/or a memory 475.

The first communication module 451 may establish a communication connection, which corresponds to a first communication scheme (e.g., a cellular network or the like), with an electronic device (e.g., the electronic device 300 of FIG. 3).

The processor 473 may establish a communication connection with the electronic device 300 or the external electronic device 400 using the first communication module 471. According to various embodiments of the disclosure, in response to receiving a signal for requesting a communication connection which is transmitted from the electronic device 300, the processor 473 may control the first communication module 471 for establishing a communication connection with the electronic device 300.

According to various embodiments of the disclosure, the processor 473 may receive device information of the electronic device 300, which is transmitted from the external electronic device 300. Based on the device information of the electronic device 300, the processor 473 may search for a communication service that an external electronic device (e.g., the external electronic device 400 of FIG. 3) connected to the electronic device 300 is capable of using, and may transmit, to the electronic device 300, identifiers of communication services that the external electronic device 400 is capable of using.

According to various embodiments of the disclosure, in response to receiving a communication service activation request signal which is transmitted from the electronic device 300, the processor 473 may perform an operation of activating a communication service. For example, the processor 473 may transmit, to the electronic device 300, configuration information related to a communication service corresponding to the activation request signal. The configuration information related to the communication service may be used when the electronic device 300 and the external electronic device 400 activate the communication service.

According to various embodiments of the disclosure, in response to receiving a communication service activation request signal which is transmitted from the electronic device 400, the processor 473 may perform an operation of activating a communication service. For example, the processor 473 may transmit, to the external electronic device 400, configuration information related to a communication service corresponding to the activation request signal. The configuration information related to the communication service may be used when the external electronic device 400 activates the communication service.

According to various embodiments of the disclosure, the memory 475 may temporarily or non-temporarily store the device information of the electronic device 300 and the external electronic device 400, a list of at least one service that the external electronic device 400 is capable of using, or configuration information related to a service.

Figure 5:
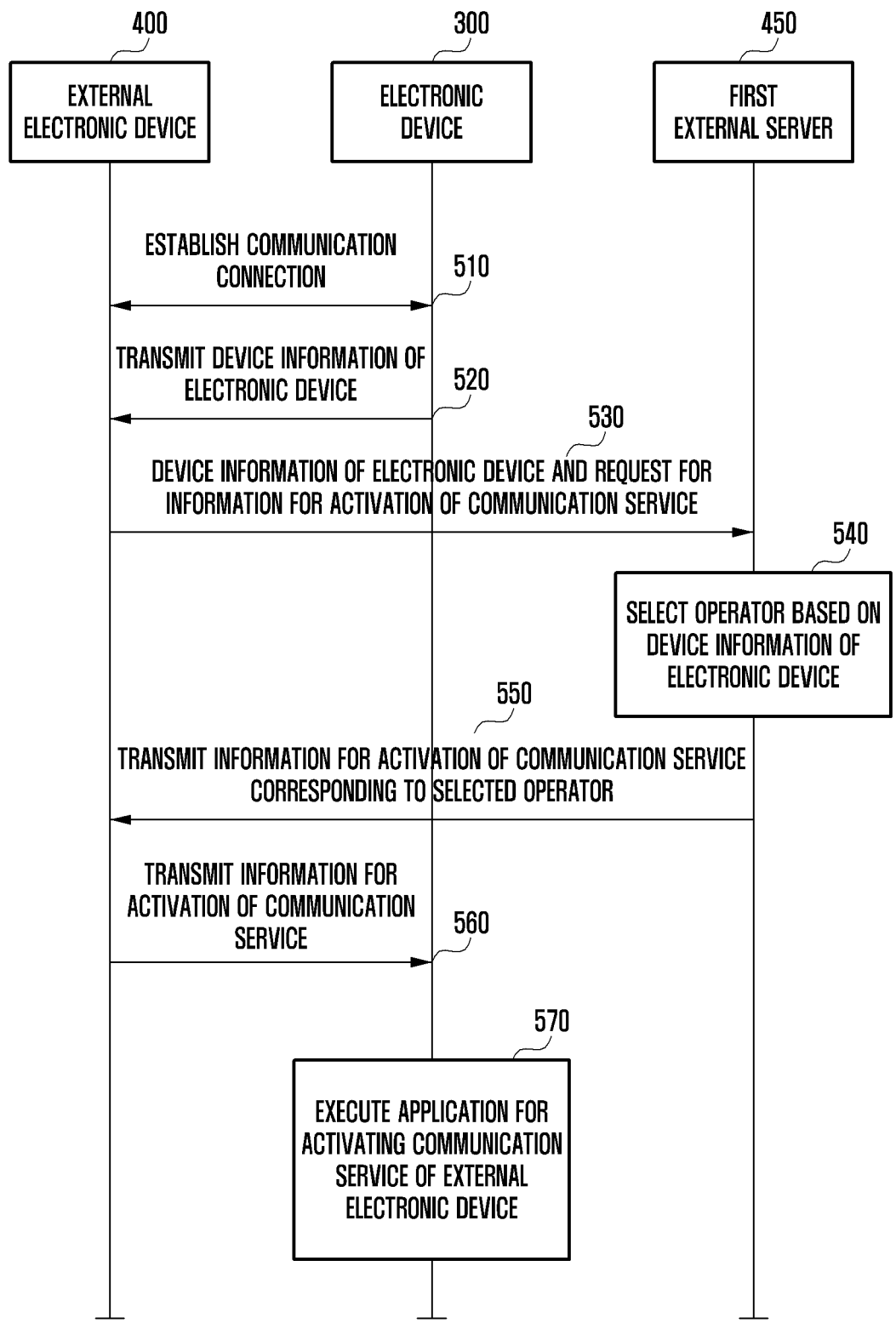
FIG. 5 is a flowchart illustrating operation of an electronic device, an external electronic device, and a first external server in order to activate a communication service of the external electronic device, according to various embodiments of the disclosure.

FIG. 5 is a flowchart illustrating operation of the electronic device 300, the external electronic device 400, and the first external server 450 in order to activate a communication service of the external electronic device, according to various embodiments of the disclosure.

According to various embodiments of the disclosure, in operation 510, the external electronic device 400 (e.g., the external electronic device 400 of FIG. 3) and the electronic device 300 (e.g., the electronic device 300 of FIG. 3) may establish a communication connection. The communication connection may be the second communication scheme (e.g., Bluetooth, NFC, or Wi-Fi direct) which has been described in FIG. 4A.

According to various embodiments of the disclosure, in operation 520, the electronic device 300 may transmit device information of the electronic device 300 to the external electronic device 400.

According to various embodiments of the disclosure, the device information of the electronic device 300 may be information used for selecting a communication service operator that provides a communication service which the electronic device 300 and the external electronic device 400 are capable of using, from among information associated with a plurality of communication service operators stored in the first external server 450. For example, the device information of the electronic device 300 may include a mobile country code (MCC) and/or a mobile network code (MNC).

According to various embodiments of the disclosure, in operation 530, the external electronic device 400 may transmit the device information of the electronic device 300 to the first external server 450, and may transmit a signal for requesting activation of a communication service to the first external server 450.

According to various embodiments of the disclosure, the electronic device 300 may support the external electronic device 400 to be capable of performing data transmission and/or reception with the first external server 450. The electronic device 300 may receive data, transmitted from the external electronic device 400, via the second communication module 320, and may transmit data, transmitted from the external electronic device 400, to the first external server 450 via the first communication module 310. The electronic device 300 may receive data, transmitted from the first external server 450, via the first communication module 310, and may transmit the received data to the external electronic device 400 via the second communication module 320. The data transmission and/or reception scheme described in the above description may be used before the communication service of the external electronic device 400 is activated, and may be used for data transmission and/or reception performed between the external electronic device 400 and the first external server 450.

According to various embodiments of the disclosure, in operation 540, the first external server 450 may select an operator based on the device information of the electronic device 300.

According to various embodiments of the disclosure, the first external server 450 may store information for activation of a communication service which differs for each communication service operator. The first external server 450 may select an operator corresponding to the device information of the electronic device 300 among a plurality of operators stored in the first external server 450. From the information for activation of a communication service which differs for each communication service operator, the first external server 450 may extract information for activation of a communication service corresponding to the selected operator, and may transmit the extracted information to the external electronic device 400.

According to various embodiments of the disclosure, in operation 550, the first external server 450 may transmit, to the external electronic device 400, information for activation of the communication service corresponding to the selected operator.

According to various embodiments of the disclosure, in operation 560, the external electronic device 400 may transmit the information for activation of the communication service to the electronic device 300.

According to various embodiments of the disclosure, in operation 570, the electronic device 300 may execute an application for activating the communication service of the external electronic device 400, based on the information for activation of the communication service.

According to various embodiments of the disclosure, based on information, which is associated with whether a communication service activation scheme is supported and is included in the information for activation of the communication service, the electronic device 300 may perform an operation for activating the communication service of the external electronic device 400 using a supported communication service activation scheme. The electronic device 300 may execute an application, stored in a memory (e.g., the memory 340 of FIG. 4A), for controlling the external electronic device 400. The electronic device 300 may activate the communication service of the external electronic device 400 based on the information for activation of the communication service using the application.

According to various embodiments of the disclosure, the electronic device 300 may display a screen for activating the communication service of the external electronic device 400, depending on information, which is associated with whether each of at least two activation schemes of the communication service is supported and is included in the information for activation of the communication service. The descriptions of a screen for activating the communication service of the external electronic device 400 will be described with reference to FIGS. 6 to 9B.

Figure 6:
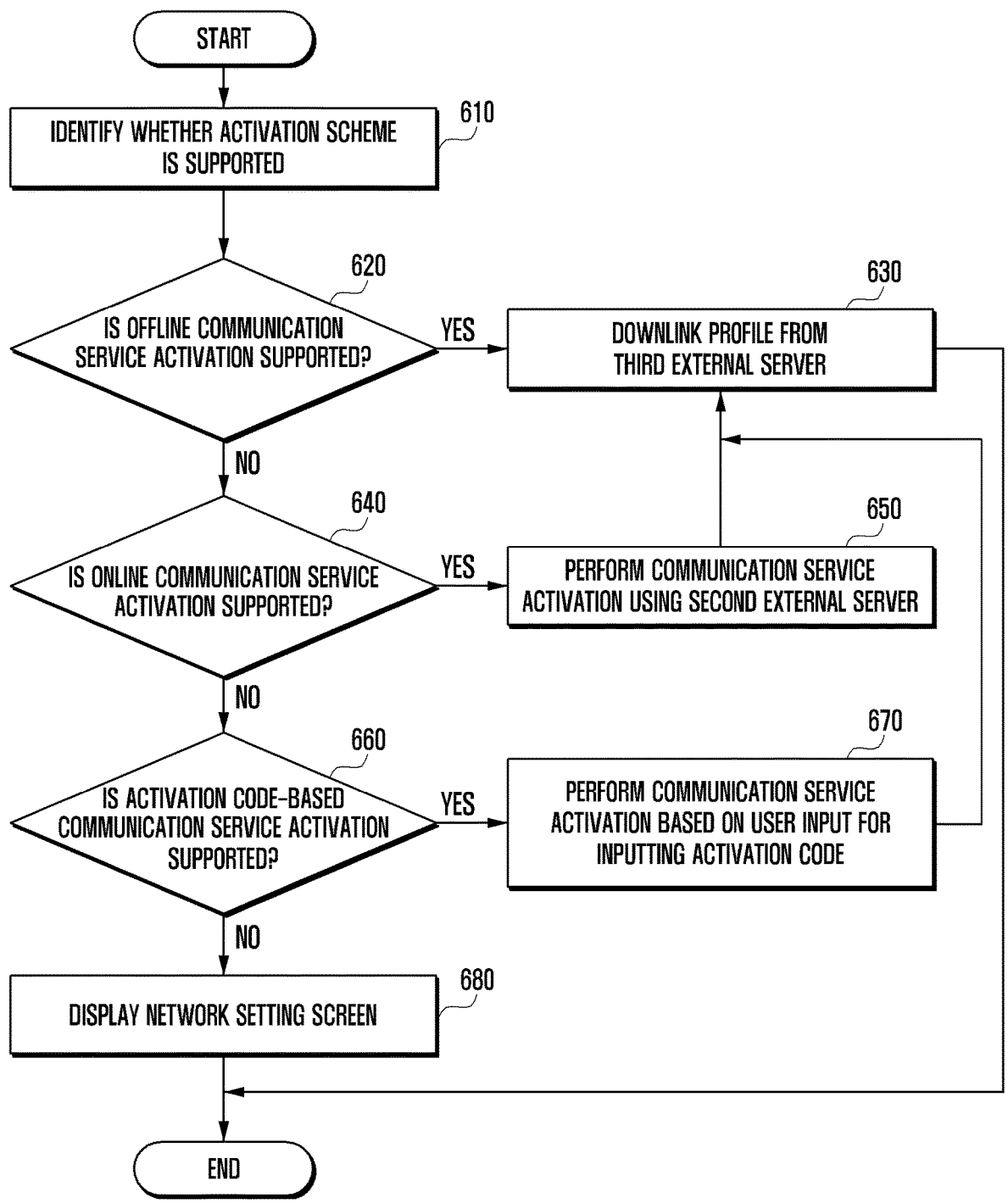
FIG. 6 is a flowchart illustrating an operation of activating a communication service by an electronic device depending on whether an activation scheme that activates a communication service is supported, according to various embodiments of the disclosure.

FIG. 6 is a flowchart illustrating an operation of activating a communication service by an electronic device, depending on whether an activation scheme that activates a communication service is supported, according to various embodiments of the disclosure.

Referring to FIG. 6, an electronic device (e.g., the electronic device 300 of FIG. 3) according to various embodiments may identify whether an activation scheme is supported in operation 610.

According to various embodiments of the disclosure, the electronic device 300 may identify whether each of at least two activation schemes is supported, included in information for activation. The information for activation of a communication service may include information indicating a communication service activation scheme that an operator that provides the communication service is capable of supporting. Operators that provide communication services may support at least one activation scheme among a first scheme that activates a communication service off-line in a shop of a communication service operator, a second scheme that activates a communication service on-line using the second external server 470, and a third scheme that activates a communication service by inputting an activation code. The electronic device 300 may receive information for activation of a communication service, transmitted from the external electronic device 400, and may identify whether an activation scheme is supported.

According to various embodiments of the disclosure, in operation 620, the electronic device 300 may identify whether the first scheme that activates a communication service off-line in a shop of a communication service operator is supported.

According to various embodiments of the disclosure, the electronic device 300 may identify data, which indicates whether a communication service operator supports the first scheme and is included in the information for activation of the communication service transmitted from the external electronic device 400. The electronic device 300 may identify whether the first scheme is supported based on the data indicating whether the first scheme is supported.

According to various embodiments of the disclosure, in operation 630, in response to identifying that the first scheme is supported, the electronic device 300 may access the third external server 490 and may download a profile from the third external server 490.

According to various embodiments of the disclosure, the electronic device 300 may transmit, to the third external server 490 via the external electronic device 400, a signal for requesting identifying of whether a profile corresponding to the identity of the external electronic device 400 (e.g., the identity of the first communication module 410 installed in the external electronic device 400) is present in the third external server 400. The third external server 490 may identify whether the profile corresponding to the identity of the external electronic device 400 is present. The third external server 490 may transmit a signal indicating whether the profile is present to the electronic device 300. For example, the electronic device 300 may identify whether the profile corresponding to the identity of the external electronic device 400 is present in the third external server 490, and may provide a screen for downloading the profile from the third external server 490. As another example, the electronic device 300 may identify that the profile corresponding to the identity of the external electronic device 400 is not present in the third external server 490, and may display a screen (e.g., a screen for accessing the second external server 470 of FIG. 8A or a screen for inputting an activation code of FIG. 9A) for inputting data so that the third external server 490 generates a profile.

According to various embodiments of the disclosure, the electronic device 300 may transmit, to the third external server 490, a signal for requesting transmission of the profile, and if the profile is present, the third external server 490 may transmit the profile to the electronic device 300. If the profile is not present, the third external server 490 may transmit an indicator indicating that the profile is not present to the electronic device 300. In response to receiving of the indicator indicating that the profile is not present, the electronic device 300 may proceed with operation 640.

According to various embodiments of the disclosure, in operation 640, the electronic device 300 may identify whether the operator that provides the communication service supports the second scheme that activates a communication service on-line using the second external server 470.

According to various embodiments of the disclosure, the electronic device 300 may identify data, which indicates whether the communication service operator supports the second scheme and is included in the information for activation of the communication service transmitted from the external electronic device 400. The electronic device 300 may identify whether the second scheme is supported based on the data indicating whether the second scheme is supported.

According to various embodiments of the disclosure, if downloading the profile from the third external server 490 fails or the electronic device 300 identifies that the first scheme is not supported, the electronic device 300 may identify whether the operator supports the second scheme.

According to various embodiments of the disclosure, in operation 650, in response to identifying that the operator supports the second scheme, the electronic device 300 may activate the communication service of the external electronic device 400 using the second external server 470.

According to various embodiments of the disclosure, the electronic device 300 may access the address of the second external server 470 included in the information for activation of the communication service, and may perform an operation (e.g., an operation of subscribing to the communication service of the external electronic device 400) for activating the communication service of the external electronic device 400 using the second external server 470). If a signal reporting that the activation of the communication service is complete is received, the electronic device 300 may access the address of the third external server 490, and may download the profile from the third external server 490 in operation 630.

According to various embodiments of the disclosure, in operation 660, the electronic device 300 identifies whether the operator that provides the communication service supports the third scheme that activates a communication service by inputting an activation code.

According to various embodiments of the disclosure, the electronic device 300 may identify data, which indicates whether the communication service operator supports the third scheme and is included in the information for activation of the communication service transmitted from the external electronic device 400. The electronic device 300 may identify whether the third scheme is supported based on the data indicating whether the third scheme is supported.

According to various embodiments of the disclosure, in operation 670, the electronic device 300 may request a user input for inputting an activation code, in response to identifying that the operator that provides the communication service supports an activation scheme using the third scheme. Based on the user input for inputting the activation code, the electronic device 300 may activate the communication service, and may access the address of the third external server 490, and may download the profile from the third external server 490 in operation 630.

According to various embodiments of the disclosure, in operation 680, in response to identifying that the operator that provides the communication service does not support an activation code-based activation scheme which activates a communication service by inputting an activation code, the electronic device 300 may control a display (e.g., the display 350 of FIG. 4A), so as to display a network setting screen. According to an embodiment, operation 680 may be omitted.

According to various embodiments of the disclosure, the network setting screen may include information for activation, received from the second external server 470.

According to various embodiments of the disclosure, the electronic device 300 may differently display a screen for activating the communication service of the external electronic device 400, depending on information, which is associated with whether each of the activation schemes of the communication service is supported and is included in the information for activating the communication service. The screen displayed is described with reference to FIGS. 7A to 9B.

According to various embodiments of the disclosure, operations 620, 640, and 660 may be performed in a different order depending the order of priorities. For example, if the online activation scheme has a higher priority than the offline activation scheme, operation 640 may be performed earlier, and whether to perform operation 620 may be determined based on a result obtained in operation 640.

FIGS. 7A to 9B are diagrams illustrating examples of a screen displayed in an electronic device depending on whether an activation scheme that activates a communication service is supported, according to various embodiments of the disclosure.

According to various embodiments of the disclosure, the electronic device 300 may differently display a screen for activating a communication service of the external electronic device 400 depending on information, which is associated with whether each of at least two activation schemes of the communication service is supported and is included in information for activation of the communication service.

Figure 7A:
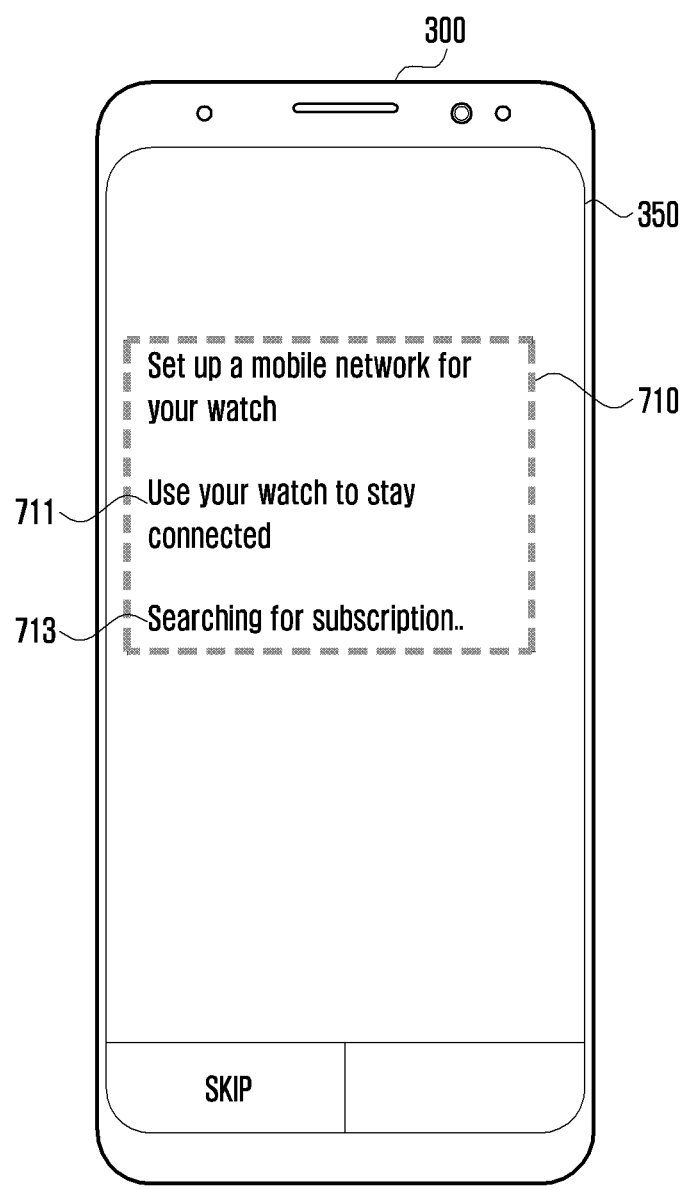
FIGS. 7A to 9B are diagrams illustrating examples of a screen displayed in an electronic device, depending on whether an activation scheme that activates a communication service is supported, according to various embodiments.

FIG. 7A is a diagram illustrating a first screen displayed on the display 350 while the electronic device 300 receives information for activation of a communication service from the external electronic device 400. The information for activation of the communication service may include information associated with whether at least one activation scheme (e.g., a first scheme that activates a communication service off-line in a shop of a communication service operator, a second scheme that activates a communication service on-line using the second external server 470, and a third scheme that activates a communication service by inputting an activation code) for performing activation of the communication service is supported.

Referring to FIG. 7A, the first screen 710 may include a message 711 that requests maintaining of the connection between the external electronic device 400 and the electronic device 300, and a message 713 reporting that information for activation of the communication service is being received.

Figure 7B:
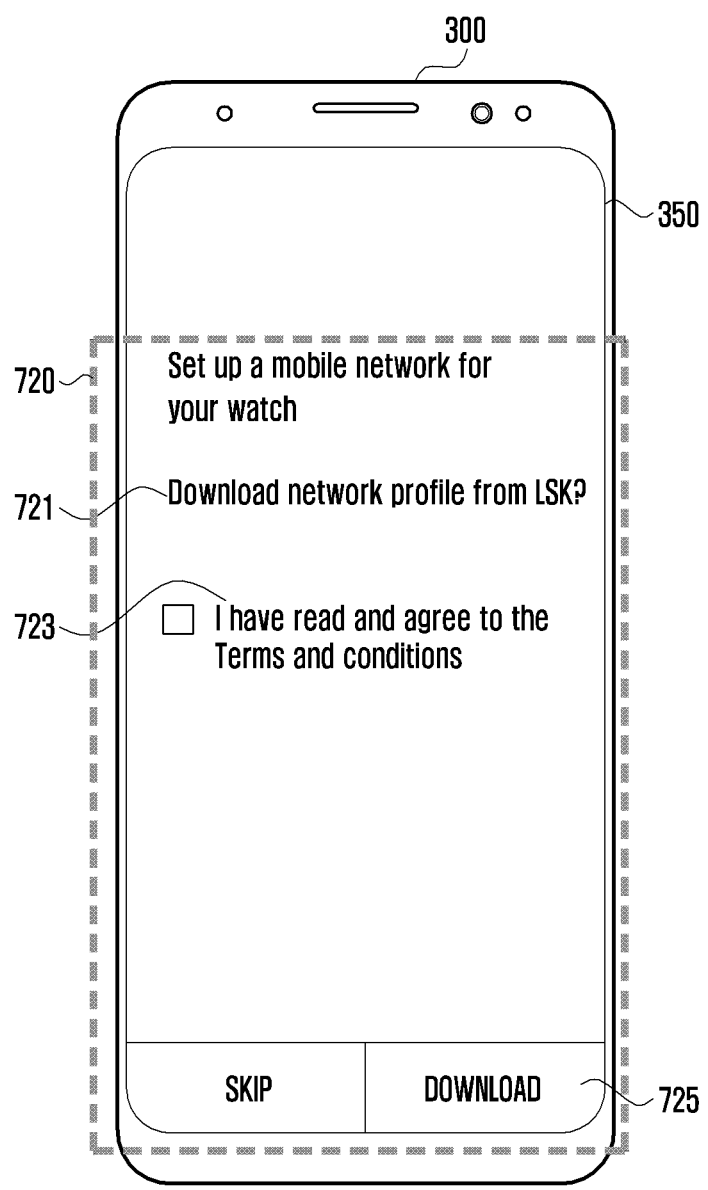

FIG. 7B is a diagram illustrating a second screen 720 displayed on the display 350 when the electronic device 300 requests a profile from the third external server 490 in response to identifying that a communication service operator supports the first scheme.

According to various embodiments of the disclosure, the electronic device 300 may identify the address of the third external server 490 included in the information for activation of the communication service in response to identifying that the communication service operator supports the first scheme. The electronic device 300 identifies whether a profile is present in the third external server 490, and may display the second screen 720 of FIG. 7B in response to identifying that the profile is present.

Referring to FIG. 7B, the second screen 720 may include a message 721 that requests a user input associated with whether to download the profile from the third external server 490, and a message 723 that requests a user input associated with whether to agree upon the terms and conditions for use of the communication service provided from the communication service operator. The electronic device 300 may download the profile from the third external server 490 in response to receiving of a user input 725 associated with downloading the profile.

Figure 7C:
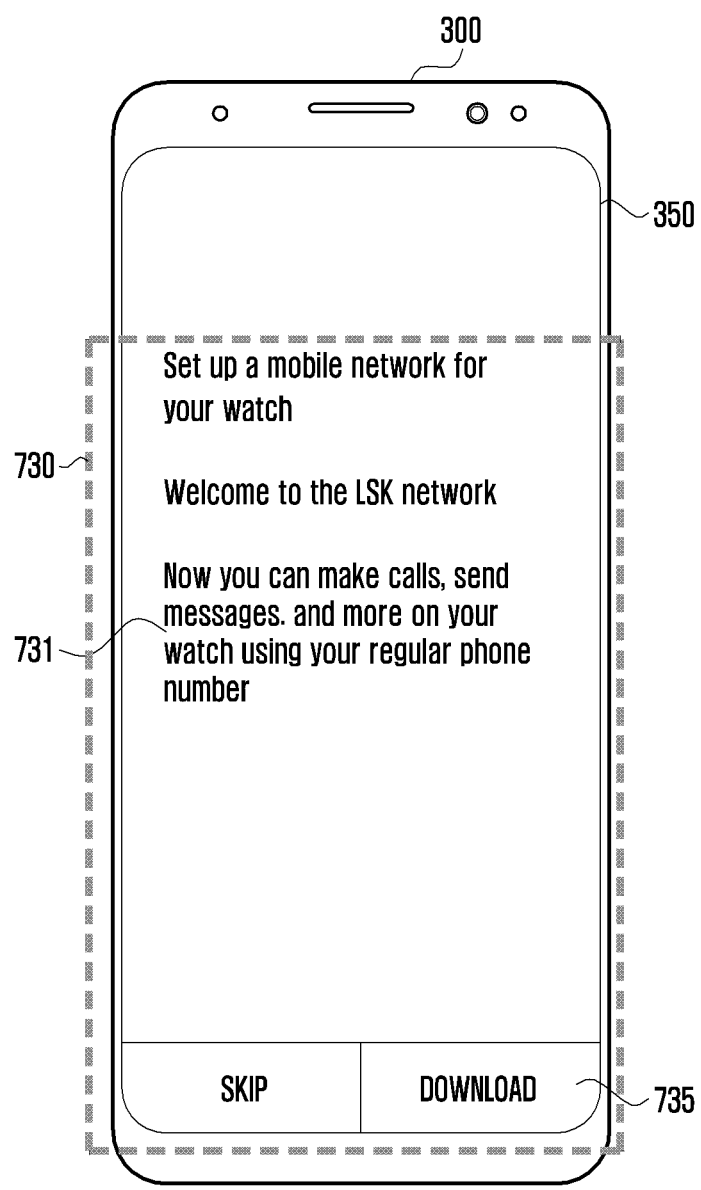

FIG. 7C is a diagram illustrating a third screen 730 displayed on the display 350, after the electronic device 300 downloads the profile from the third external server 490.

Referring to FIG. 7C, the screen 730 may include a message 731 reporting that downloading of the profile is successfully complete.

Figure 8A:
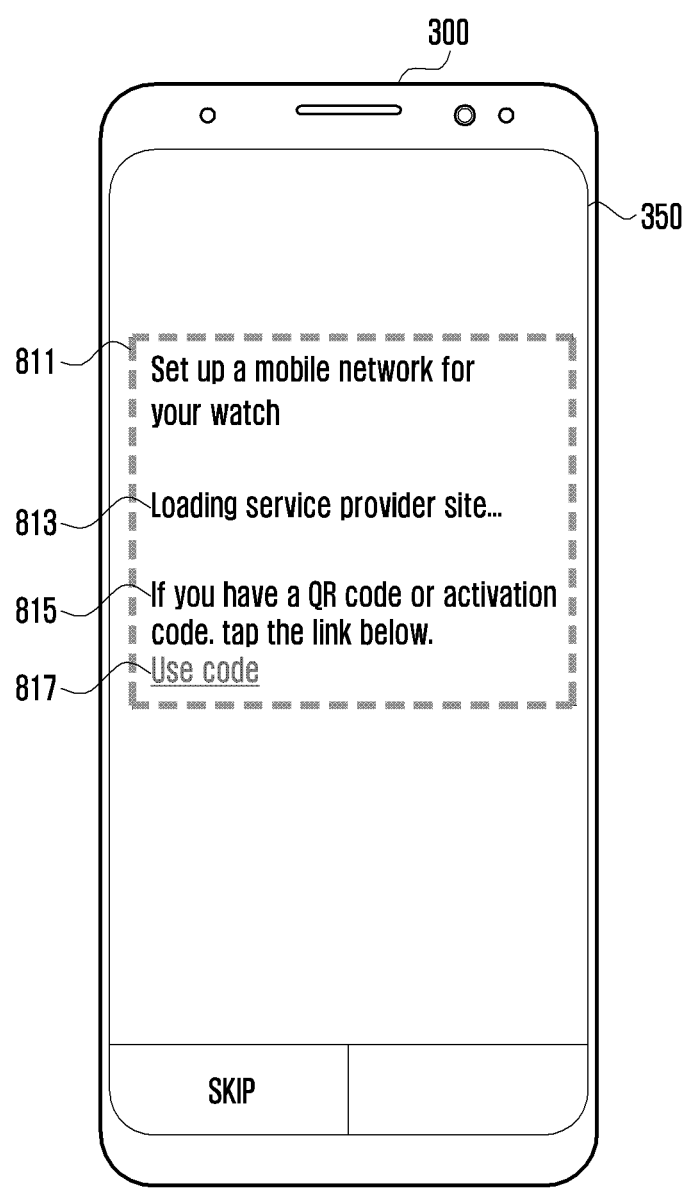

FIG. 8A is a diagram illustrating a third screen 811 displayed on the display 350, while the electronic device 300 activates the communication service of the external electronic device 400 using the second scheme that activates a communication service on-line using the second external server 470.

According to various embodiments of the disclosure, the electronic device 300 may identify whether the operator that provides the communication service supports the second scheme that activates a communication service on-line using the second external server 470. In response to identifying that the operator supports the second scheme, the electronic device 300 may access the address of the second external server 470 included in the information for activation of the communication service. The electronic device 300 may request, from the second external server 470, the address of a webpage for activating the communication service. The electronic device 300 may load the webpage for activating the communication service using the webpage address transmitted from the second external server 470, and may display the loaded webpage on the display 350.

Referring to FIG. 8A, the electronic device 300 may display the third screen 811 including a message 813 reporting that the webpage is loading, while loading the webpage.

According to various embodiments of the disclosure, the electronic device 300 may identify whether the communication operator supports the third scheme that activates a communication service using an activation code, based on the information for activation which is transmitted from the external electronic device 400. In response to identifying that the third scheme is supported, the electronic device 300 may display, on the third screen 811, a message 815 requesting input of an activation code if a user has the activation code. The electronic device 300 may display, on the third screen 811, an input area 817 for triggering a user input for inputting the activation code.

Figure 8B:
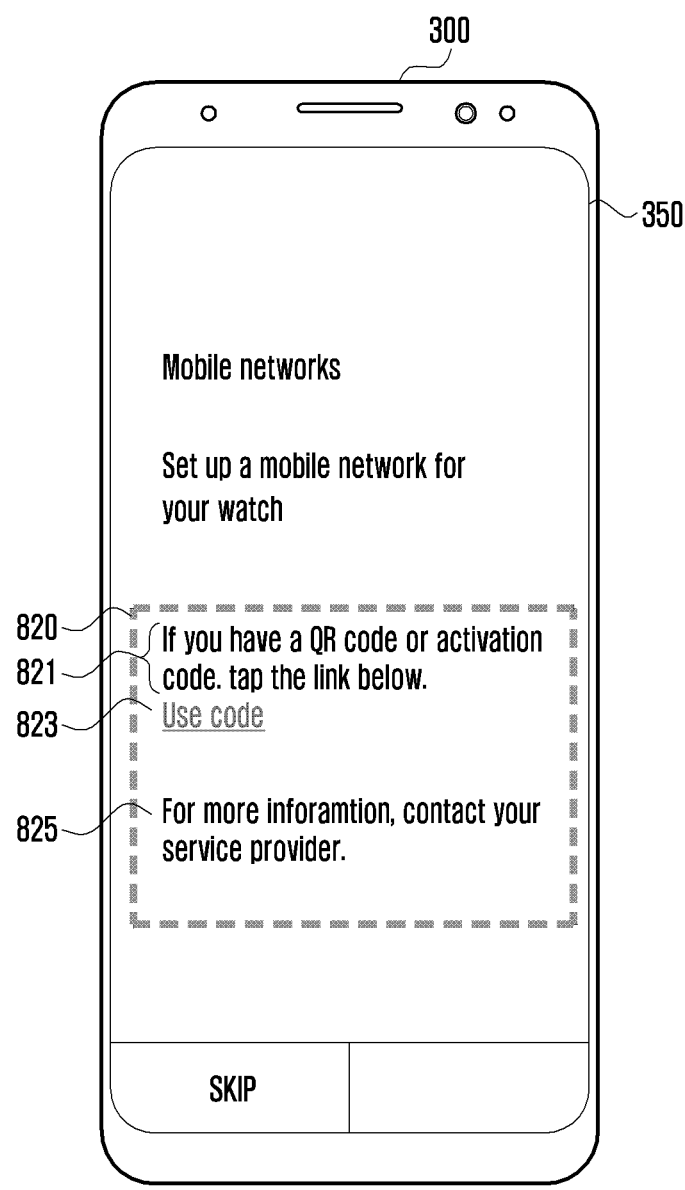

FIG. 8B is a diagram illustrating a fourth screen 820 displayed on the display 350, in response to identifying, by the electronic device 300, that the communication operator supports the third scheme that activates a communication service using an activation code.

According to various embodiments of the disclosure, the electronic device 300 may identify whether the communication operator supports the third scheme that activates a communication service using an activation code, based on the information for activation which is transmitted from the external electronic device 400. In response to identifying that the third scheme is supported, the electronic device 300 may display, on a fourth screen 820, a message 821 requesting input of an activation code if a user has the activation code. The electronic device 300 may display an input area 823 for triggering a user input for inputting the activation code and a message 825 informing that asking the communication service operator is available, on the fourth screen 820.

Figure 9A:
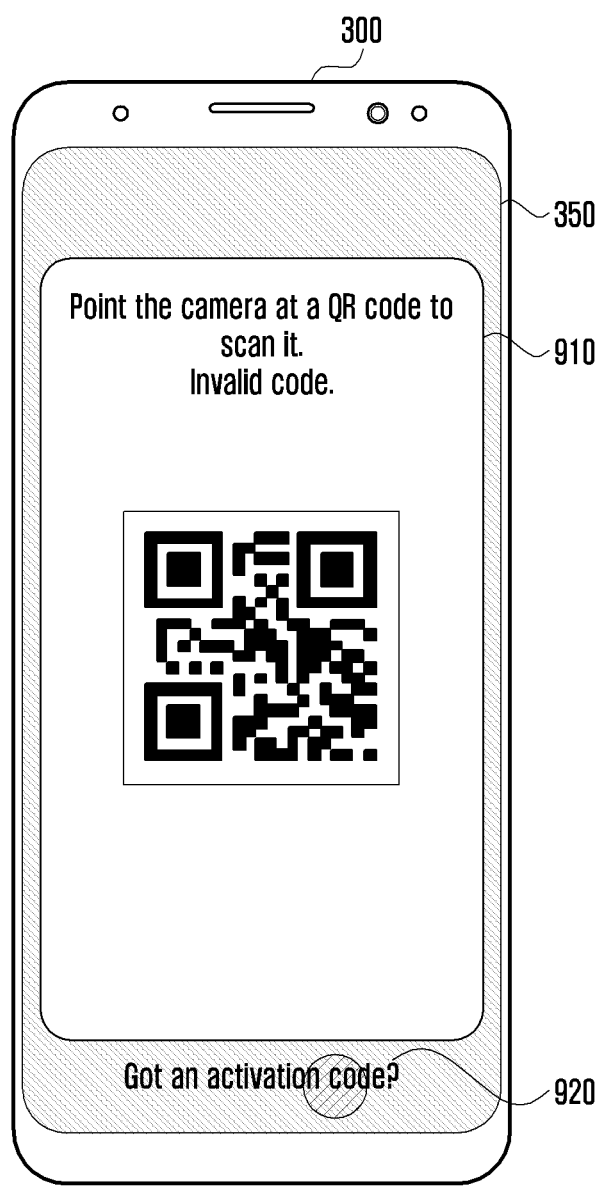
Figure 9B:
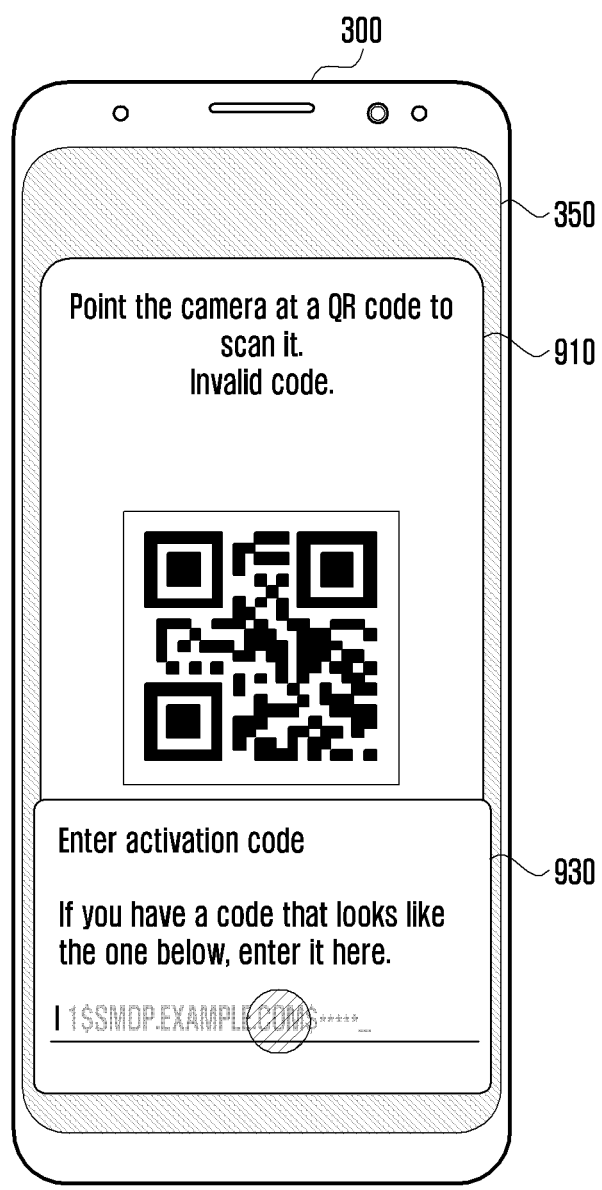

FIGS. 9A and 9B are diagrams illustrating an embodiment of activating a communication service using an activation code by an electronic device according to various embodiments of the disclosure.

Referring to FIGS. 9A and 9B, the electronic device 300 according to various embodiments of the disclosure may control the display 350, so as to display a screen for receiving a user input for inputting an activation code. The electronic device 300 may display a screen for receiving a user input for inputting an activation code, in response to receiving a user input on the input area 817 or 823 for triggering a user input for inputting the activation code as shown in FIGS. 8A and 8B.

According to various embodiments of the disclosure, the activation code may be a key for activation of the communication service of the external electronic device 400. The activation code may be implemented as a key including characters, numbers, or special characters, or may be implemented in the form of QR-code.

Referring to FIG. 9A, the electronic device 300 may activate a camera (e.g., the camera module 180 of FIG. 1) in order to receive input of QR-code, and may capture an object including QR-code using the camera 180. The electronic device 300 may display an image 910 that the camera 180 is receiving, in real time. The electronic device 300 may capture QR-code and may analyze the QR-code so as to obtain an activation code. The electronic device 300 may perform activation of the communication service of the external electronic device 400 based on the obtained activation code.

According to various embodiments of the disclosure, the electronic device 300 may display an area for inputting an activation code which is implemented in the form of characters. In response to receiving a user input 920 to the area for inputting an activation code, the electronic device 300 may display an area for inputting an activation code.

Referring to FIG. 9B, the electronic device 300 may display an area 930 for inputting an activation code. For example, the electronic device 300 may display the area 930 for inputting an activation code by overlaying an area that displays an image that the camera 180 is receiving.

FIG. 10 is a diagram illustrating information associated with whether an external electronic device is capable of being opened, which is stored in a first external server and is displayed in an electronic device according to various embodiments of the disclosure.

According to various embodiments of the disclosure, the first external server 450 may store information associated with an electronic device (e.g., the external electronic device 400 of FIG. 3) which is capable of activating a communication service. The information associated with the electronic device 400 capable of activating a communication service may include the model information of the electronic device 400, the identity information of the communication service operator of the electronic device 400 and/or the version information of an operating system (OS) installed in the electronic device 400.

Referring to FIG. 10, the first external server 450 may include model information 1010 and 1020 of electronic devices capable of activating a communication service, information 1011 and 1021 associated with communication service operators respectively corresponding to the models, and/or version information 1013 and 1023 of OSs capable of activating a communication service. The information associated with an electronic device capable of activating a communication service is stored in the first external server 450 and thus, the electronic device 300 may identify whether a communication service of the external electronic device 400 is capable of being activated, without accessing a server (e.g., the second external server 470 and the third external server 490) operated by the operator that provides a communication service.

According to various embodiments of the disclosure, the electronic device 300 may determine whether the external electronic device 400 is an electronic device capable of activating a communication service, based on the information associated with the electronic device capable of activating a communication service.

The electronic device 300 according to various embodiments may include a display (e.g., the display 350 of FIG. 4A), the memory 340 configured to store device information of the electronic device 300 and an application for activating a communication service of an external electronic device (e.g., the external electronic device 400 of FIG. 3), a first communication module (e.g., the first communication module 310 of FIG. 4A) configured to establish a first communication channel with at least one server among the first external server 450 storing information associated with a plurality of operators that provide communication services, the second external server 470 related to activation of a communication service, and the third external server 490 that provides a profile for use of a communication service, a second communication module (e.g., the second communication module 320 of FIG. 4) configured to establish a second communication channel with the external electronic device 400, and a processor (e.g., the processor 330 of FIG. 4A). The processor 330 may be configured to: transmit the device information of the electronic device 300 to the external electronic device 400 using the second communication module 320; receive, from the external electronic device 400, information for activation of a communication service identified based on the device information of the electronic device 300; and controlling the application so as to display a screen for performing activation of the communication service of the external electronic device 400 based on information, which is associated with whether each of at least two activation schemes for the communication service is supported and is included in the information for activation of the communication service.

In the electronic device 300 according to various embodiments, the processor 330 may be configure to: identify whether an operator that provides the communication service supports a first scheme that opens a communication service off-line, based on at least a part of the information for activation of the communication service; request the profile from the third external server 490 using the address of the third external server 490 included in the information for activation of the communication service in response to identifying that the first scheme is supported; and controlling the application so as to display a screen reporting that requesting the profile from the third external service 490 is ongoing.

In the electronic device 300 according to various embodiments, the processor 330 may be configured to: identify whether the operator supports a second scheme that supports opening of a communication service on-line, based on the information for activation of the communication service; request the address of a webpage for subscribing to the communication service, from the second external server 470 using the address of the second external server 470 included in the information for activation of the communication service, in response to identifying that the second scheme is supported; and control the application so as to display the webpage received from the second external server 470.

In the electronic device 300 according to various embodiments, the processor 330 may be configured to control the application so as to display a screen that requests input of an activation code, while loading the webpage.

In the electronic device 300 according to various embodiments, the processor 330 may be configured to: identify whether a third scheme that opens the communication service using the activation code is supported, based on at least a part of the information for activation of the communication service; and control the application so as to display a screen that requests input of the activation code, in response to identifying that the third scheme is supported.

In the electronic device 300 according to various embodiments, the activation code may be implemented as QR code, and the processor 330 may control so as to perform activation of a camera in order to receive the QR code.

In the electronic device 300 according to various embodiments, the processor 330 may be configured to: receive a request for enabling the external electronic device 400 to access the first external server 450 via the first communication channel, from the external electronic device 400 using the second communication channel; in response to receiving the request, transmit the device information of the electronic device 300 and a request for transmission of the information for activation the communication service corresponding to the device information, which are transmitted from the external electronic device 400, to the first external service 450 using the first communication channel; and transmit, to the external electronic device 400, the information for activation of the communication service transmitted from the first external server 450.

In the electronic device 300 according to various embodiments, the processor 330 may be configured to: identify information, which is associated with an external electronic device capable of activating the communication service and is included in the information for activation of the communication service; and determine whether the communication service of the external electronic device 400 is capable of being activated based on at least a part of information from among identity information of the communication service provider included in information associated with the external electronic device 400, identity information of the external electronic device 400, and version information of an OS installed in the external electronic device 400.

In the electronic device 300 according to various embodiments, the device information of the electronic device 300 may include a mobile country code (MCC) and a mobile network code (MNC).

An electronic device (e.g., the external electronic device 400 of FIG. 3) according to various embodiments may include a display (e.g., the display device 160 of FIG. 1), the memory 440 storing device information of an external electronic device (e.g., the electronic device 300 of FIG. 3), a first communication module (e.g., the first communication module 410 of FIG. 4A) configured to establish a first communication channel based on a cellular communication service, a second communication module (e.g., the second communication module 420 of FIG. 4A) configured to establish a second communication channel with the external electronic device 300, and a processor (e.g., the processor 430 of FIG. 4A). The processor 430 may be configured to: transmit, to the external electronic device 300 via the second communication channel, a request signal for requesting transmission of the device information of the external electronic device 300; transmit the device information of the external electronic device 300 transmitted from the external electronic device 300 and a request for transmission of information for activation of a cellular communication service corresponding to the device information, to the first external server 450 that stores information associated with a plurality of operators that provide communication services, based on a communication service provided by the external electronic device 300; transmit, to the external electronic device 300, information for activation of the cellular communication service received from the first external server 450; and activate the cellular communication service based on data transmitted from the external electronic device 300.

In the electronic device 400 according to various embodiments, the information for activation of the cellular communication service may include communication service activation scheme information including whether an operator that provides the communication service supports a first scheme that opens a communication service off-line, whether the operator supports a second scheme that supports opening of a communication service on-line, and/or whether a third scheme that uses an activation code provided by the operator is supported.

An operation method of the electronic device 300 according to various embodiments may include: generating a first communication channel for performing data transmission and/or reception with at least one server among a first external service (e.g., the first external server 450 of FIG. 3) that stores information associated with a plurality of operators that provide communication services, a second external server (e.g., the second external server 470 of FIG. 3) related to activation of a communication service, and a third external server (e.g., the third external server 490 of FIG. 3) that provides a profile for use of a communication service, and generating a second communication channel for performing data transmission and/or reception with an external electronic device; transmitting device information of the electronic device 300 to the external electronic device (e.g., the external electronic device 400 of FIG. 3); receiving, from the external electronic device 400, information for activation of a communication service of the external electronic device 400 which is identified based on the device information of the electronic device 300; and displaying a screen for activating the communication service of the external electronic device 400 based on information, which is associated with whether each of at least two activation schemes of the communication service is supported and is included in the information for activation of the communication service.

In the operation method of the electronic device 300 according to various embodiments, the operation of displaying the screen may include: identifying whether an operator that provides the communication service supports a first scheme that opens a communication service off-line, based on the information for activation of the communication service; in response to identifying that the first scheme is supported, requesting the profile from the third external server 490 using the address of the third external server 490 included in the information for activation of the communication service; and displaying a screen reporting that requesting the profile from the third external server 490 is ongoing.

In the operation method of the electronic device 300 according to various embodiments, the operation of displaying the screen may include: identifying whether the operator supports a second scheme that supports opening of a communication service on-line, based on the information for activation of the communication service; requesting, from the first external server 450, the address of a webpage for subscribing to the communication service, using the address of the first external server 450 related to activation of the communication service, in response to identifying that the second scheme is supported; and displaying the webpage received from the first external server 450.

The operation method of the electronic device 300 according to various embodiments may further include: displaying a screen for requesting input of an activation code, while loading the webpage.

In the operation method of the electronic device 300 according to various embodiments, the operation of displaying the screen may include: identifying whether a third scheme that opens the communication service using the activation code is supported, based on the information for activation of the communication service; and displaying a screen that requests input of the activation code, in response to identifying that the third scheme is supported.

In the operation method of the electronic device 300 according to various embodiments, the activation code may be implemented as QR code, and to the operation method of the electronic device may further include controlling a camera so as to receive the QR code.

The operation method of the electronic device 300 according to various embodiments may further include: receiving a request for enabling the external electronic device 400 to access the first external server 450 via the first communication channel, using the second communication channel; in response to receiving the request, transmitting the device information of the electronic device 300 and a request for transmission of the information for activation the communication service corresponding to the device information, which are transmitted from the external electronic device 400, to the first external service 450 using the first communication channel; and transmitting, to the external electronic device 400, the information for activation of the communication service transmitted from the first external server 450.

The operation method of the electronic device 300 according to various embodiments may further include: identifying information, which is associated with an external electronic device capable of activating the communication service and is included in the information for activation of the communication service; and determining whether the communication service of the external electronic device 400 is capable of being activated based on at least a part of information from among identity information of the communication service provider included in information associated with the external electronic device 400, identity information of the external electronic device 400, and version information of an OS installed in the external electronic device 400.

In the operation method of the electronic device 300 according to various embodiments, the device information of the electronic device 300 may include a mobile country code (MCC) and a mobile network code (MNC).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
   a display;
   a memory configured to store device information of the electronic device and an application for activating a communication service of an external electronic device;
   a first communication module configured to establish a first communication channel with at least one server among a first external server storing information associated with a plurality of operators that provide communication services, a second external server related to activation of a communication service, and a third external server that provides a profile for use of a communication service;
   a second communication module configured to establish a second communication channel with the external electronic device; and
   a processor,
   wherein the processor is configured to:
   transmit the device information of the electronic device to the external electronic device using the second communication module;
   receive, from the external electronic device, information for activation of a communication service identified based on the device information of the electronic device, the information for activation of the communication service including information associated with whether an operator that provides the communication service supports a first scheme that opens a communication service off-line, a second scheme that opens the communication service on-line, and a third scheme that opens the communication service using an activation code;

identify whether the operator supports the first scheme, the second scheme, and the third scheme based on at least a part of the information for activation of the communication service; and control the application so as to display a screen for performing activation of a communication service of the external electronic device based on the identification that the operator supports each of the first scheme, the second scheme, and the third scheme.

2. The electronic device of claim 1, wherein the processor is configured to:

request the profile from the third external server using an address of the third external server included in the information for activation of the communication service in response to identifying that the first scheme is supported; and control the application so as to display a screen reporting that requesting the profile from the third external service is ongoing.

3. The electronic device of claim 1, wherein the processor is configured to:

request an address of a webpage for subscribing to the communication service, from the second external server using an address of the second external server included in the information for activation of the communication service, in response to identifying that the second scheme is supported; and control the application so as to display the webpage received from the second external server.

4. The electronic device of claim 3, wherein the processor is configured to control the application so as to display a screen that requests input of an activation code, while loading the webpage.

5. The electronic device of claim 1, wherein the processor is configured to:

control the application so as to display a screen that requests input of the activation code, in response to identifying that the third scheme is supported.

6. The electronic device of claim 5, wherein the activation code is implemented as QR code, and wherein the processor is configured to activate a camera in order to receive the QR code.

7. The electronic device of claim 1, wherein the processor is configured to:

receive a request for enabling the external electronic device to access the first external server via the first communication channel, from the external electronic device using the second communication channel;

in response to receiving the request, transmit the device information of the electronic device and a request for transmission of the information for activation of the communication service corresponding to the device information, which are transmitted from the external electronic device, to a first external service using the first communication channel; and transmit, to the external electronic device, the information for activation of the communication service transmitted from the first external server.

8. The electronic device of claim 1, wherein the processor is configured to:

identify information, which is associated with an external electronic device capable of activating the communication service and is included in the information for activation of the communication service; and determine whether the communication service of the external electronic device is capable of being activated based on at least a part of information from among identity information of the communication service provider included in information associated with the external electronic device, identity information of the external electronic device, and version information of an OS installed in the external electronic device.

9. The electronic device of claim 1, wherein the device information of the electronic device comprises a mobile country code (MCC) and a mobile network code (MNC).

10. An electronic device, comprising:

a display;

a memory configured to store device information of the electronic device;

a first communication module configured to establish a first communication channel based on a cellular communication service;

a second communication module configured to establish a second communication channel with an external electronic device; and a processor, wherein the processor is configured to:

transmit, to the external electronic device via the second communication channel, a request signal for requesting transmission of the device information of the electronic device;

transmit the device information of the electronic device transmitted from the external electronic device and a request for transmission of information for activation of a cellular communication service corresponding to the device information, to a first external server that stores information associated with a plurality of operators that provide communication services, based on a communication service provided by the external electronic device;

transmit, to the external electronic device, information for activation of the cellular communication service received from the first external server, the information for activation of the communication service including information associated with whether an operator that provides the communication service supports a first scheme that opens a communication service off-line, a second scheme that opens the communication service on-line, and a third scheme that opens the communication service using an activation code; and activate the cellular communication service based on data transmitted from the external electronic device, wherein the external electronic device identifies whether the operator supports the first scheme, the second scheme, and the third scheme based on at least a part of the information for activation of the communication service.

11. An operation method of an electronic device, comprising:

generating a first communication channel for performing data transmission and/or reception with at least one server among a first external service that stores information associated with a plurality of operators that provide communication services, a second external server related to activation of a communication service, and a third external server that provides a profile for use of a communication service, and generating a second communication channel for performing data transmission and/or reception with an external electronic device;

transmitting device information of the electronic device to the external electronic device;

receiving, from the external electronic device, information for activation of a communication service of the external electronic device which is identified based on the device information of the electronic device, the information for activation of the communication service including information associated with whether an operator that provides the communication service supports a first scheme that opens a communication service off-line, a second scheme that opens the communication service on-line, and a third scheme that opens the communication service using an activation code;

identifying whether the operator supports the first scheme, the second scheme, and the third scheme based on at least a part of the information for activation of the communication service; and displaying a screen for activating the communication service of the external electronic device based on information, which is associated with whether each of at least two activation schemes of the communication service is supported and is included in the information for activation of the communication service.

12. The method of claim 11, wherein the displaying the screen comprises:

identifying whether an operator that provides the communication service supports a first scheme that opens a communication service off-line, based on the information for activation of the communication service;

in response to identifying that the first scheme is supported, requesting the profile from the third external server using an address of the third external server included in the information for activation of the communication service; and displaying a screen reporting that requesting the profile from the third external server is ongoing.

13. The method of claim 11, wherein the displaying the screen comprises:

identifying whether the operator supports a second scheme that supports opening of a communication service on-line, based on the information for activation of the communication service;

requesting, from the first external server, an address of a webpage for subscribing to the communication service, using an address of the first external server related to activation of the communication service, in response to identifying that the second scheme is supported; and displaying the webpage received from the first external server.

14. The method of claim 13, further comprising:

displaying a screen for requesting input of an activation code, while loading the webpage.

* * * * *